United States Patent [19]
Popovich et al.

[11] Patent Number: 6,115,152
[45] Date of Patent: Sep. 5, 2000

[54] HOLOGRAPHIC ILLUMINATION SYSTEM

[75] Inventors: Milan M. Popovich, Leicester, United Kingdom; Jonathan D. Waldern, Los Altos Hills, Calif.; John J. Storey, Nottingham, United Kingdom

[73] Assignee: DigiLens, Inc., Sunnyvale, Calif.

[21] Appl. No.: 09/395,889

[22] Filed: Sep. 14, 1999

Related U.S. Application Data

[60] Provisional application No. 60/100,218, Sep. 14, 1998.

[51] Int. Cl.$^7$ ...................................................... G02B 5/32
[52] U.S. Cl. ................................ 359/15; 359/22; 359/24; 359/618; 359/634; 353/30; 353/31
[58] Field of Search .................................. 359/15, 22, 24, 359/618, 629, 634; 353/30, 31, 34; 349/201, 202

[56] References Cited

U.S. PATENT DOCUMENTS

| | | |
|---|---|---|
| 3,807,829 | 4/1974 | Close . |
| 4,458,981 | 7/1984 | Huignard . |
| 4,500,163 | 2/1985 | Burns et al. . |
| 4,669,812 | 6/1987 | Hoebing . |
| 4,790,613 | 12/1988 | Moss . |
| 4,799,739 | 1/1989 | Newswanger . |

(List continued on next page.)

FOREIGN PATENT DOCUMENTS

| | | | |
|---|---|---|---|
| 3419098 A1 | 11/1985 | European Pat. Off. | ......... G02B 27/22 |
| 0 389 123 A2 | 9/1990 | European Pat. Off. | ......... G03B 21/56 |
| 0 559 435 A1 | 9/1993 | European Pat. Off. | ......... G11B 7/135 |
| 0 777 136 A1 | 6/1997 | European Pat. Off. | .......... G02B 5/20 |

OTHER PUBLICATIONS

Tanaka, et al. *"Holographically Formed Liquid–Crystal/Polymer Device For Reflective Color Display"*, 2320 Journal of the Society for Information Display 2 (1994) Apr. No. 1, New York, US.

*Primary Examiner*—Cassandra Spyrou
*Assistant Examiner*—Leo Boutsikaris
*Attorney, Agent, or Firm*—Skjerven, Morrill, MacPherson, Franklin & Friel, L.L.P.

[57] ABSTRACT

Holographic optical elements (HOEs) can be used in systems and methods for providing illumination and for projecting images. The HOEs may be switchable HOEs, whose diffractive properties can be controlled. Described herein is a method of combining light from two or more illumination sources. In one embodiment, a reflection-type HOE is illuminated by the first illumination source. The HOE diffracts light from the first illumination source into an output direction. Light from the second illumination source is transmitted through the HOE and onto a reflective optical element, which reflects the light back through the HOE and into the same output direction. Also described is a projection system that uses two or more HOEs to combine two or more colors of light for use by a single image display. The system includes one or more light sources, an image display (such as a reflective or transmissive LCD display or a MEMS display, for example), and a first and a second HOE. The HOEs are each mounted between a light source and the image display, and configured to provide one color of light to the image display and from the image display into an output direction. In one embodiment, the HOEs are switchable HOEs and can be used for color-sequential display and/or for color balancing.

21 Claims, 18 Drawing Sheets

U.S. PATENT DOCUMENTS

| | | |
|---|---|---|
| 4,807,951 | 2/1989 | Moss . |
| 4,834,473 | 5/1989 | Keyes, IV et al. . |
| 4,834,476 | 5/1989 | Benton . |
| 4,932,731 | 6/1990 | Suzuki et al. . |
| 4,981,332 | 1/1991 | Smith et al. . |
| 4,993,790 | 2/1991 | Vick . |
| 5,011,244 | 4/1991 | Smith ........................................ 309/22 |
| 5,014,709 | 5/1991 | Bjelkhagen et al. . |
| 5,024,494 | 6/1991 | Williams et al. . |
| 5,035,474 | 7/1991 | Moss . |
| 5,036,385 | 7/1991 | Eichenlaub et al. . |
| 5,044,709 | 9/1991 | Smith et al. . |
| 5,071,209 | 12/1991 | Chang . |
| 5,093,563 | 3/1992 | Small et al. . |
| 5,111,313 | 5/1992 | Shires . |
| 5,151,724 | 9/1992 | Kikinis . |
| 5,227,898 | 7/1993 | Iavecchia et al. . |
| 5,278,532 | 1/1994 | Hegg et al. . |
| 5,299,035 | 3/1994 | Leith et al. . |
| 5,305,124 | 4/1994 | Chern et al. . |
| 5,341,229 | 8/1994 | Rowan . |
| 5,379,133 | 1/1995 | Kirk . |
| 5,424,866 | 6/1995 | Kikinis . |
| 5,440,428 | 8/1995 | Hegg et al. . |
| 5,471,327 | 11/1995 | Tedesco et al. . |
| 5,506,701 | 4/1996 | Ichikawa . |
| 5,521,724 | 5/1996 | Shires . |
| 5,537,232 | 7/1996 | Biles . |
| 5,557,283 | 9/1996 | Sheen et al. . |
| 5,561,537 | 10/1996 | Aritake et al. . |
| 5,568,313 | 10/1996 | Steenblick . |
| 5,570,208 | 10/1996 | Kato et al. . |
| 5,581,378 | 12/1996 | Kulick . |
| 5,589,957 | 12/1996 | Aritake et al. . |
| 5,606,455 | 2/1997 | Eichenlaub . |
| 5,608,552 | 3/1997 | Smith ........................................ 349/5 |
| 5,615,023 | 3/1997 | Yang . |
| 5,617,225 | 4/1997 | Aritake et al. . |
| 5,644,414 | 7/1997 | Kato et al. . |
| 5,680,231 | 10/1997 | Grinberg et al. . |
| 5,696,552 | 12/1997 | Aritake et al. . |
| 5,703,702 | 12/1997 | Crane et al. . |
| 5,717,509 | 2/1998 | Kato et al. . |
| 5,729,366 | 3/1998 | Yang et al. . |
| 5,736,958 | 4/1998 | Turpin . |
| 5,751,243 | 5/1998 | Turpin . |
| 5,757,522 | 5/1998 | Kulick et al. . |
| 5,760,933 | 6/1998 | Aritake et al. . |
| 5,774,175 | 6/1998 | Hattori . |
| 5,777,742 | 7/1998 | Marron . |
| 5,790,284 | 8/1998 | Taniguchi et al. . |
| 5,796,498 | 8/1998 | French . |
| 5,796,499 | 8/1998 | Wenyon . |
| 5,808,759 | 9/1998 | Okamori et al. . |
| 5,815,222 | 9/1998 | Matsuda et al. . |
| 5,825,448 | 10/1998 | Bos et al. . |
| 5,825,540 | 10/1998 | Gold et al. . |
| 5,942,157 | 8/1999 | Sutherland et al. . |

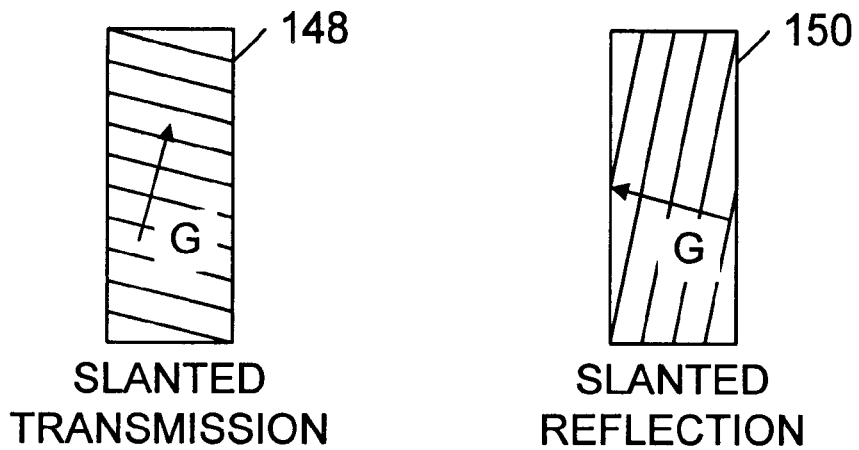
SLANTED
TRANSMISSION
SLANTED
REFLECTION
FIG. 11a
FIG. 11b
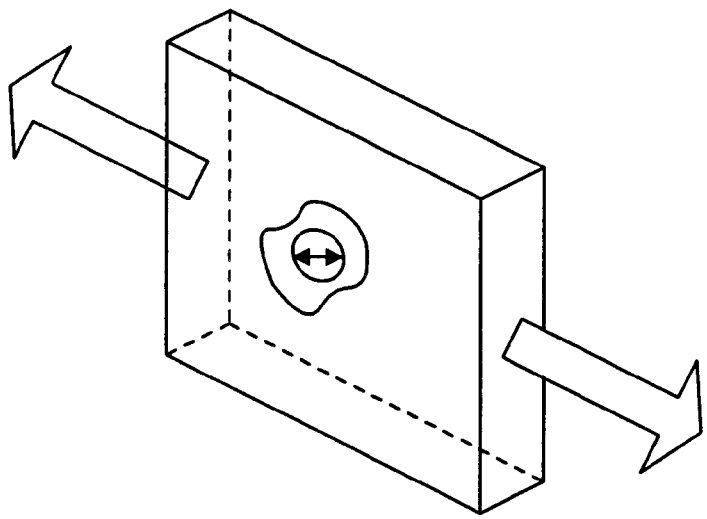
FIG. 12

LIGHT TRANSMITTED

LIGHT BLOCKED

TRANSMITTED

RETRO-REFLECTED

UNSWITCHED STATE

SWITCHED STATE

HOLOGRAPHIC ILLUMINATION SYSTEM

RELATED APPLICATIONS

This application claims priority to U. S. Provisional Application No. 60/100,218, entitled "Holographic Illumination System," by inventors Milan M. Popovich and Jonathan D. Waldern, filed Sep. 14, 1998.

BACKGROUND OF THE INVENTION

1. Field of the Invention

The invention relates generally to illumination systems, and particularly to light sources in video projection displays.

2. Description of the Related Art

Projective display systems are a growing technology in the market of televisions and digital monitors. Projective displays use images focussed onto a diffuser to present an image to a user. The projection may be done from the same side of the diffuser as the user, as in the case of cinema projectors, or from the opposite side. The image is typically generated on one or more "displays" —a miniature LCD device that reflects or transmits light in a pattern formed by switchable pixels. The LCD displays are generally fabricated with microelectronics processing techniques. Each pixel in the display is a region whose reflective or transmissive properties can be controlled by an electrical signal. In an LCD display, light incident on a particular pixel is either reflected, partially reflected, or blocked by the pixel, depending on the signal applied to that pixel. In some cases, LCD displays are transmissive devices where the transmission through any pixel can be varied in steps (gray levels) over a range extending from a state where light is substantially blocked to the state in which incident light is substantially transmitted. More recently, displays have also been constructed from micro-electromechanical devices (MEMs) that incorporate small movable mirrors. The mirrors, one or more at each pixel, control whether or not light is reflected into an output direction.

When a uniform beam of light is reflected from (or transmitted through) a display, the beam gains a spatial intensity profile that depends on the transmission state of the pixels. An image is formed at the LCD by adjusting the transmission (or gray level) of the pixels to correspond to a desired image. This image can be imaged onto a diffusing screen for direct viewing or alternatively it can be imaged onto some intermediate image surface from which it can be magnified by an eye-piece to give a virtual image, as for example in a wearable display.

The displays are generally monochromatic devices: each pixel is either "on" or "off" or set to an intermediate intensity level. The display typically cannot individually control the intensity of more than one color component of the image. To provide color control, a display system may use three independent LCD displays. Each of the three LCD displays is illuminated by a separate light source with spectral components that stimulate one of the three types of cones in the human eye. The three displays each reflect (or transmit) a beam of light that makes one color component of a color image. The three beams are then combined through prisms, a system of dichroic filters, and/or other optical elements into a single chromatic image beam.

Another method of generating a full color image, which eliminates the problems of combining the beams from three separate displays is to sequentially illuminate a single monochromatic display that is updated with the appropriate primary color components of the image.

The displays can be configured as arrays of red, green, and blue pixels that are illuminated by white light with arrays of color filters being used to illuminate each pixel with the appropriate color. However, generating a color image in this manner will reduce image resolution since only one third of the pixels are available for each primary color.

A significant part of the design considerations for these systems involves the choices of light sources and provisions for effective control over the relative intensities of the light sources. This control is required to allow effective color balancing during initial calibrations as well as during operation.

Holograms essentially generate predetermined wavefronts by means of diffractive structures recorded inside hologram mediums. A hologram may be used to reproduce the effects of a particular optical element, such as a lens or a mirror. In certain cases, where complex optical operations are not being reproduced, "holographic optical elements" (HOEs) may be based on simple diffraction gratings. These HOEs may be far easier and less expensive to produce than their glass counterparts, especially when the optical element is complicated or must meet stringent tolerances. HOEs can be compact, lightweight and wavelength specific which allows more flexibility in designing optical systems. HOEs may be used to replace individual optical elements, groups of elements and in some cases entire systems of conventional optical components.

SUMMARY OF THE INVENTION

Holographic optical elements (HOEs) can be used in systems and methods for providing illumination and for projecting images. The HOEs may be electrically switchable HOEs, whose diffractive properties can be controlled. In one embodiment, a switchable HOE can be gradually and reversibly switched from a diffracting state to a transmitting state by an applied electrical field.

Described herein is a method of combining light from two or more different illumination sources. The method includes illuminating a reflective or transmissive-type holographic optical element (HOE) with light from the first illumination source. The HOE diffracts light from the first illumination source into an output direction. This output direction may be an image display (or "video display") or any other object that needs to be illuminated. Light from the second illumination source is transmitted through the HOE (either because it is of the wrong color or has the wrong incidence angle) and onto a reflective optical element, which reflects the light back through the HOE and into the same output direction as the first illumination source.

The reflective optical element may also implemented as a holographic element, making it a second HOE. Additionally, the reflective HOE and/or the reflective optical element may be a switchable HOE. Further, one or both of these devices may also be used to compensate for aberrations in a an image projected in the light or to otherwise modify spatial profiles of the light. The first and second illumination sources may be used to provide light of different colors.

Also described is an illumination system comprising an HOE and a reflective optical element. The HOE is configured to diffract light from a first light source into an output direction. The reflective optical element is disposed so that light from a second light source passes through the HOE and onto the reflective optical element. The reflective optical element reflects light from the second light source into the same output direction.

The reflective optical element may be a second HOE that diffractively reflects light from the second light source into the output direction. One or both of the elements may be a switchable HOE, and one or both of them may be used for aberration correction or for beam-shaping.

This disclosure further describes a projection system that uses two or more HOEs to combine two or more colors of light from two or more different light sources. The system includes a first light source for a first color of light, a second light source for a second color of light, an image display (such as a reflective or transmissive LCD display or a MEMS display, for example), and a first and a second HOE. The first HOE is mounted between the image display and the first light source, and is configured to provide the first color of light from the first light source to the image display and from the image display into an output direction. Similarly, the second HOE is mounted between the image display and the second light source, and is configured to provide the second color of light from the second light source to the image display and from the image display into the same output direction.

Each HOE preferably uses diffraction (i) to direct light from its corresponding source to the image display and/or (ii) to direct light from the image display into the output direction. The first HOE is preferably transparent to the second color of light, and vice versa. The HOEs may be transmission-type holograms or reflection-type holograms.

In one embodiment, the HOEs are switchable HOEs. They may then be switched so that their operation corresponds with the turning on of their corresponding light source and/or the image display showing the corresponding color component of an image.

In one embodiment, the projection system is a trichromatic color-sequential projection system. In this embodiment, the projection system has three light sources for three different colors, such as red, green, and blue, for example. The projection system in this embodiment also has three corresponding HOEs. The image display sequentially displays red, green, and blue components of an image. The HOEs and/or the light sources are sequentially switched so that when a red image is displayed, the image display is illuminated with light from the red source. When a green image is displayed, the image display is illuminated with light from the green source, etc.

Also described herein is a projection system that has only one broadband light source. An image display in the system reflects or transmits light from the source into an output direction with the aid of two or more HOEs. The HOEs are color selective. The HOEs may additionally provide beamshaping for their color components. Additionally, the HOEs may be switchable HOEs, allowing color balancing and/or color-sequential projection.

BRIEF DESCRIPTION OF THE DRAWINGS

Other objects and advantages of the invention will become apparent upon reading the following detailed description and upon reference to the accompanying drawings in which:

FIG. 11a and FIG. 11b are representative side views of a slanted transmission grating (FIG. 11a) and a slanted reflection grating (FIG. 11b) showing the orientation of the grating vector G of the periodic planes of polymer channels and PDLC channels;

FIG. 12 is an elevational view of a reflection grating when a shear stress field is applied thereto;

Figure 1:
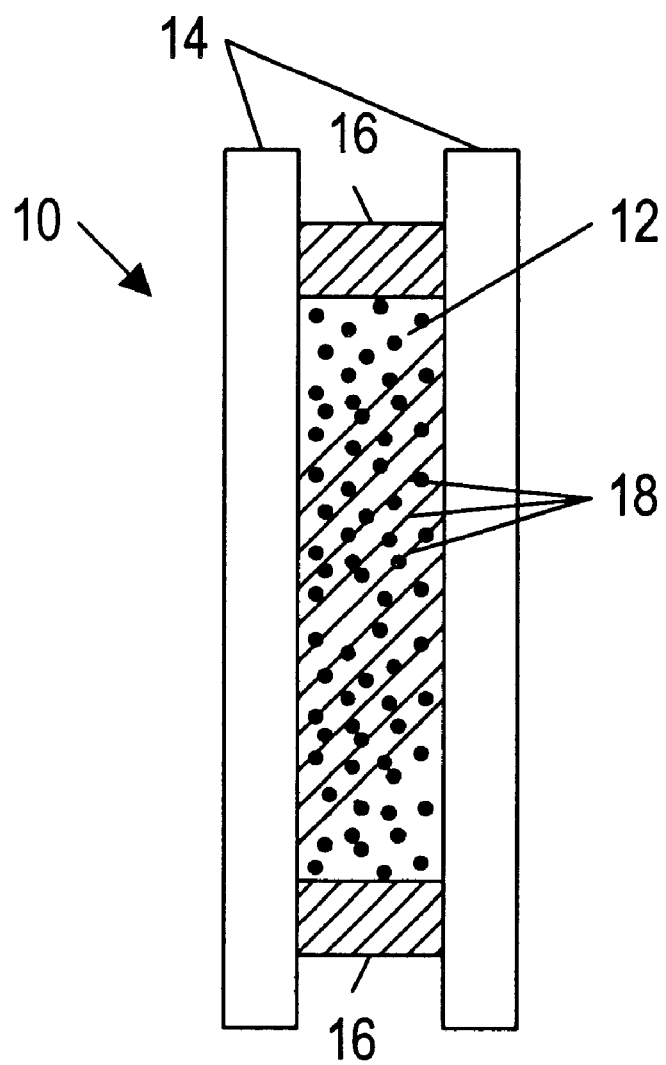
FIG. 1 is a cross-sectional view of an electrically switchable hologram made of an exposed polymer-dispersed liquid crystal (PDLC) material.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, that the intention is to cover all modifications, equivalents and alternatives falling within the spirit and scope of the present invention as defined by the claims set forth below.

DETAILED DESCRIPTION OF THE PREFERRED EMBODIMENTS

The following patent application is hereby incorporated by reference in its entirety as though fully and completely set forth herein: U. S. Provisional Application No. 60/100,218, entitled "Holographic Illumination System," by inventors Milan M. Popovich and Jonathan D. Waldern, filed Sep. 14, 1998.

Holographic optical elements (HOEs) enable the construction of several types of illumination systems. These systems may be used to combine light sources of different colors to provide polychromatic or "white"-light illumination. The introduction of switchable (or "reconfigurable") HOEs allows intensity control over individual color components of the white light. Switchable HOEs can also be employed in systems that generate color images through color-sequential illumination of monochromatic image displays (or "video displays").

FIGS. 1–17: Switchable Hologram Materials and Devices.

Holographic optical elements are formed, in one embodiment, from a polymer dispersed liquid crystal (PDLC) material comprising a monomer, a dispersed liquid crystal, a cross-linking monomer, a coinitiator and a photoinitiator dye. These PDLC materials exhibit clear and orderly separation of the liquid crystal and cured polymer, whereby the PDLC material advantageously provides high quality optical elements. The PDLC materials used in the holographic optical elements may be formed in a single step.

The holographic optical elements may also use a unique photopolymerizable prepolymer material that permits in situ control over characteristics of resulting gratings, such as domain size, shape, density, ordering and the like. Furthermore, methods and materials taught herein can be used to prepare PDLC materials for optical elements comprising switchable transmission or reflection type holographic gratings.

Polymer dispersed liquid crystal materials, methods, and devices contemplated for use in the present invention are also described in R. L. Sutherland et al., "Bragg Gratings in an Acrylate Polymer Consisting of Periodic Polymer dispersed Liquid-Crystal Planes," *Chemistry of Materials*, No. 5, pp. 1533–1538 (1993); in R. L. Sutherland et al., "Electrically switchable volume gratings in polymer dispersed liquid crystals," *Applied Physics Letters*, Vol. 64, No. 9, pp. 1074–1076 (1994); and T. J. Bunning et al., "The Morphology and Performance of Holographic Transmission Gratings Recorded in Polymer dispersed Liquid Crystals," *Polymer*, Vol. 36, No. 14, pp. 2699–2708 (1995), all of which are fully incorporated by reference into this Detailed Description. U.S. pat. application Ser. No. 08/273,436 and U.S. Pat. No. 5,698,343 to Sutherland et al., titled "Switchable Volume Hologram Materials and Devices," and "Laser Wavelength Detection and Energy Dosimetry Badge," respectively, are also incorporated by reference and include background material on the formation of transmission gratings inside volume holograms.

In one embodiment, the process of forming a hologram is controlled primarily by the choice of components used to prepare the homogeneous starting mixture, and to a lesser extent by the intensity of the incident light pattern. In one embodiment, the polymer dispersed liquid crystal (PDLC) material employed in the present invention creates a switchable hologram in a single step. A feature of one embodiment of PDLC material is that illumination by an inhomogeneous, coherent light pattern initiates a patterned, anisotropic diffusion (or counter diffusion) of polymerizable monomer and second phase material, particularly liquid crystal (LC). Thus, alternating well-defined channels of second phase-rich material, separated by well-defined channels of a nearly pure polymer, can be produced in a single-stop process.

The resulting PDLC material may have an anisotropic spatial distribution of phase-separated LC droplets within the photochemically cured polymer matrix. Prior art PDLC materials made by a single-step process can achieve at best only regions of larger LC bubbles and smaller LC bubbles in a polymer matrix. The large bubble sizes are highly scattering which produces a hazy appearance and multiple ordering diffractions, in contrast to the well-defined first order diffraction and zero order diffraction made possible by the small LC bubbles of one embodiment of PDLC material in well-defined channels of LC-rich material. Reasonably well-defined alternately LC-rich channels and nearly pure polymer channels in a PDLC material are possible by multi-step processes, but such processes do not achieve the precise morphology control over LC droplet size and distribution of sizes and widths of the polymer and LC-rich channels made possible by one embodiment of PDLC material.

The same may be prepared by coating the mixture between two indium-tin-oxide (ITO) coated glass slides separated by spacers of nominally 10–20 $\mu$m thickness. The sample is placed in a conventional holographic recording setup. Gratings are typically recorded using the 488 nm line of an argon ion laser with intensities of between about 0.1–100 mW/cm$^2$ and typical exposure times of 30–120 seconds. The angle between the two beams is varied to vary the spacing of the intensity peaks, and hence the resulting grating spacing of the hologram. Photopolymerization is induced by the optical intensity pattern. A more detailed discussion of exemplary recording apparatus can be found in R. L. Sutherland, et al., "Switchable holograms in new photopolymer-liquid crystal composite materials," Society of Photo-Optical Instrumentation Engineers (SPIE), Proceedings Reprint, Volume 2402, reprinted from *Diffractive and Holographic Optics Technology II* (1995), incorporated herein by reference.

The features of the PDLC material are influenced by the components used in the preparation of the homogeneous starting mixture and, to a lesser extent, by the intensity of the incident light pattern. In one embodiment, the prepolymer material comprises a mixture of a photopolymerizable monomer, a second phase material, a photoinitiator dye, a coinitiator, a chain extender (or cross-linker), and, optionally, a surfactant.

In one embodiment, two major components of the prepolymer mixture are the polymerizable monomer and the second phase material, which are preferably completely miscible. Highly functionalized monomers may be preferred because they form densely cross-linked networks which shrink to some extent and to tend to squeeze out the second phase material. As a result, the second phase material is moved anisotropically out of the polymer region and, thereby, separated into well-defined polymer-poor, second phase-rich regions or domains. Highly functionalized monomers may also be preferred because the extensive cross-linking associated with such monomers yields fast kinetics, allowing the hologram to form relatively quickly, whereby the second phase material will exist in domains of less than approximately 0.1 $\mu$m.

Highly functionalized monomers, however, are relatively viscous. As a result, these monomers do not tend to mix well with other materials, and they are difficult to spread into thin films. Accordingly, it is preferable to utilize a mixture of penta-acrylates in combination with di-, tri-, and/or tetra-acrylates in order to optimize both the functionality and viscosity of the prepolymer material. Suitable acrylates, such as triethyleneglycol diacrylate, trimethylolpropane triacrylate, pentaerythritol triacrylate, pentaerythritol tetracrylate, pentaerythritol pentacrylate, and the like can be used. In one embodiment, it has been found that an approximately 1:4 mixture of tri- to penta-acrylate facilitates homogeneous mixing while providing a favorable mixture for forming 10–20 $\mu$m films on the optical plates.

The second phase material of choice is a liquid crystal (LC). This also allows an electro-optical response for the resulting hologram. The concentration of LC employed should be large enough to allow a significant phase separation to occur in the cured sample, but not so large as to make the sample opaque or very hazy. Below about 20% by weight very little phase separation occurs and diffraction efficiencies are low. Above about 35% by weight, the sample becomes highly scattering, reducing both diffraction efficiency and transmission. Samples fabricated with approximately 25% by weight typically yield good diffraction efficiency and optical clarity. In prepolymer mixtures utilizing a surfactant, the concentration of LC may be increased to 35% by weight without loss in optical performance by adjusting the quantity of surfactant. Suitable liquid crystals contemplated for use in the practice of the present invention may include the mixture of cyanobiphenyls marketed as E7 by Merck, 4'-n-pentyl-4-cyanobiphenyl, 4'-n-heptyl-4-cyanobiphenyl, 4'-octaoxy-4-cyanobiphenyl, 4'-pentyl-4-cyanoterphenyl, -methoxybenzylidene-4'-butylaniline, and the like. Other second phase components are also possible.

The polymer dispersed liquid crystal material employed in the practice of the present invention may be formed from a prepolymer material that is a homogeneous mixture of a polymerizable monomer comprising dipentaerythritol hydroxypentacrylate (available, for example, from Polysciences, Inc., Warrington, Pa.), approximately 10–40 wt % of the liquid crystal E7 (which is a mixture of cyanobiphenyls marketed as E7 by Merck and also available from BDH Chemicals, Ltd., London, England), the chain-extending monomer N-vinylp-yrrolidinone ("NVP") (available from the Aldrich Chemical Company, Milwaukee, Wis.), coinitiator N-phenylglycine ("NPG") (also available from the Aldrich Chemical Company, Milwaukee, Wis.), and the photoinitiator dye rose bengal ester; (2,4,5,7-tetraiodo-3',4', 5',6'-tetrachlorofluorescein-6-acetate ester) marketed as RBAX by Spectragraph, Ltd., Maumee, Ohio). Rose bengal is also available as rose bengal sodium salt (which must be esterified for solubility) from the Aldrich Chemical Company. This system has a very fast curing speed which results in the formation of small liquid crystal micro-droplets.

The mixture of liquid crystal and prepolymer material are homogenized to a viscous solution by suitable means (e.g., ultrasonification) and spread between indium-tin-oxide (ITO) coated glass sides with spacers of nominally 15–100 $\mu$m thickness and, preferably, 10–20 $\mu$m thickness. The ITO is electrically conductive and serves as an optically transparent electrode. Preparation, mixing and transfer of the prepolymer material onto the glass slides are preferably done in the dark as the mixture is extremely sensitive to light.

The sensitivity of the prepolymer materials to light intensity is dependent on the photoinitiator dye and its concentration. A higher dye concentration leads to a higher sensitivity. In most cases, however, the solubility of the photoinitiator dye limits the concentration of the dye and, thus, the sensitivity of the prepolymer material. Nevertheless, it has been found that for more general applications, photoinitiator dye concentrations in the range of 0.2–0.4% by weight are sufficient to achieve desirable sensitivities and allow for a complete bleaching of the dye in the recording process, resulting in colorless final samples. Photoinitiator dyes that may be useful in generating PDLC materials are rose bengal ester (2,4,5,7-tetraiodo-3',4',5',6'-tetrachlorofluorescein-6-acetate ester); rose bengal sodium salt; eosin; eosin sodium salt; 4,5-diiodosuccinyl fluorescein; camphorquinone; methylene blue, and the like. These dyes allow a sensitivity to recording wavelengths across the visible spectrum from nominally 400 nm to 700 nm. Suitable near-infrared dyes, such as cationic cyanine dyes with trialkylborate anions having absorption from 600–900 nm as well as merocyanine dyes derived from spiropyran may also find utility in the present invention.

The coinitiator employed in the formulation of the hologram controls the rate of curing in the free radical polymerization reaction of the prepolymer material. Optimum phase separation and, thus, optimum diffraction efficiency in the resulting PDLC material, are a function of curing rate. It has been found that favorable results can be achieved utilizing coinitiator in the range of 2–3% by weight. Suitable coinitiators include N-phenylglycine; triethyl amine; triethanolamine; N,N-dimethyl-2,6-diisopropyl aniline, and the like.

Other suitable dyes and dye coinitiator combinations that may be suitable for use in producing holographic optical elements, particularly for visible light, include eosin and triethanolamine; camphorquinone and N-phenylglycine; fluorescein and triethanolamine; methylene blue and triethanolamine or N-phenylglycine; erythrosin B and triethanolamine; indolinocarbocyanine and triphenyl borate; iodobenzospiropyran and triethylamine, and the like.

The chain extender (or cross linker) employed in creating holographic optical elements may help to increase the solubility of the components in the prepolymer material as well as increase the speed of polymerization. The chain extender is preferably a smaller vinyl monomer as compared with the pentacrylate, whereby it can react with the acrylate positions in the pentacrylate monomer, which are not easily accessible to neighboring pentaacrylate monomers due to steric hindrance. Thus, reaction of the chain extender monomer with the polymer increases the propagation length of the growing polymer and results in high molecular weights. It has been found that chain extender in general applications in the range of 10–18% by weight maximizes the performance in terms of diffraction efficiency. In the one embodiment, it is expected that suitable chain extenders can be selected from the following: N-vinylpyrrolidinone; N-vinyl pyridine; acrylonitrile; N-vinyl carbazole, and the like.

It has been found that the addition of a surfactant material, namely, octanoic acid, in the prepolymer material lowers the switching voltage and also improves the diffraction efficiency. In particular, the switching voltage for PDLC materials containing a surfactant are significantly lower than those of a PDLC material made without the surfactant. While not wishing to be bound by any particular theory, it is believed that these results may be attributed to the weakening of the anchoring forces between the polymer and the phase-separated LC droplets. SEM studies have shown that droplet sizes in PDLC materials including surfactants are reduced to the range of 30–50 nm and the distribution is more homogeneous. Random scattering in such materials is reduced due to the dominance of smaller droplets, thereby increasing the diffraction efficiency. Thus, it is believed that the shape of the droplets becomes more spherical in the presence of surfactant, thereby contributing to the decrease in switching voltage.

For more general applications, it has been found that samples with as low as 5% by weight of surfactant exhibit a significant reduction in switching voltage. It has also been found that, when optimizing for low switching voltages, the concentration of surfactant may vary up to about 10% by weight (mostly dependent on LC concentration) after which there is a large decrease in diffraction efficiency, as well as an increase in switching voltage (possibly due to a reduction in total phase separation of LC). Suitable surfactants include octanoic acid; heptanoic acid; hexanoic acid; dodecanoic acid; decanoic acid, and the like.

In samples utilizing octanoic acid as the surfactant, it has been observed that the conductivity of the sample is high, presumably owing to the presence of the free carboxyl (COOH) group in the octanoic acid. As a result, the sample increases in temperature when a high frequency (~2 KHz) electrical field is applied for prolonged periods of time. Thus, it is desirable to reduce the high conductivity introduced by the surfactant, without sacrificing the high diffraction efficiency and the low switching voltages. It has been found that suitable electrically switchable gratings can be formed from a polymerizable monomer, vinyl neononanoate ("VN") $C_8H_{17}CO_2CH=CH_2$, commercially available from the Aldrich Chemical Co. in Milwaukee, Wis. Favorable results have also been obtained where the chain extender N-vinylpyrrolidinone ("NVP") and the surfactant octanoic acid are replaced by 6.5% by weight VN. VN also acts as a chain extender due to the presence of the reactive acrylate monomer group. In these variations, high optical quality samples were obtained with about 70% diffraction efficiency, and the resulting gratings could be electrically switched by an applied field of 6V/$\mu$m.

PDLC materials may also be formed using a liquid crystalline bifunctional acrylate as the monomer ("LC monomer"). LC monomers have an advantage over conventional acrylate monomers due to their high compatibility with the low molecular weight nematic LC materials, thereby facilitating formation of high concentrations of low molecular weight LC and yielding a sample with high optical quality. The presence of higher concentrations of low molecular weight LCD in the PDLC material greatly lowers the switching voltages (e.g., to ~2V/$\mu$m). Another advantage of using LC monomers is that it is possible to apply low AC or DC fields while recording holograms to pre-align the host LC monomers and low molecular weight LC so that a desired orientation and configuration of the nematic directors can be obtained in the LC droplets. The chemical formulate of several suitable LC monomers are as follows:

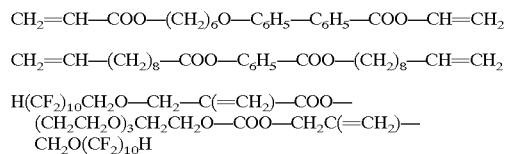

Semifluorinated polymers are known to show weaker anchoring properties and also significantly reduced switching fields. Thus, it is believed that semifluorinated acrylate monomers which are bifunctional and liquid crystalline may find suitable application in the formulation of holograms.

Referring now to FIG. 1, there is shown a cross-sectional view of an electrically switchable hologram 10 made of an exposed polymer dispersed liquid crystal material made according to the teachings of this description. A layer 12 of the polymer dispersed liquid crystal material is sandwiched between a pair of indium-tin-oxide coated glass slides 14 and spacers 16. The interior of hologram 10 shows Bragg transmission gratings 18 formed when layer 12 was exposed to an interference pattern from two intersecting beams of coherent laser light. The exposure times and intensities can be varied depending on the diffraction efficiency and liquid crystal domain size desired. Liquid crystal domain size can be controlled by varying the concentrations of photoinitiator, coinitiator and chain-extending (or cross-linking) agent. The orientation of the nematic directors can be controlled while the gratings are being recorded by application of an external electric field across the ITO electrodes.

Figure 2:
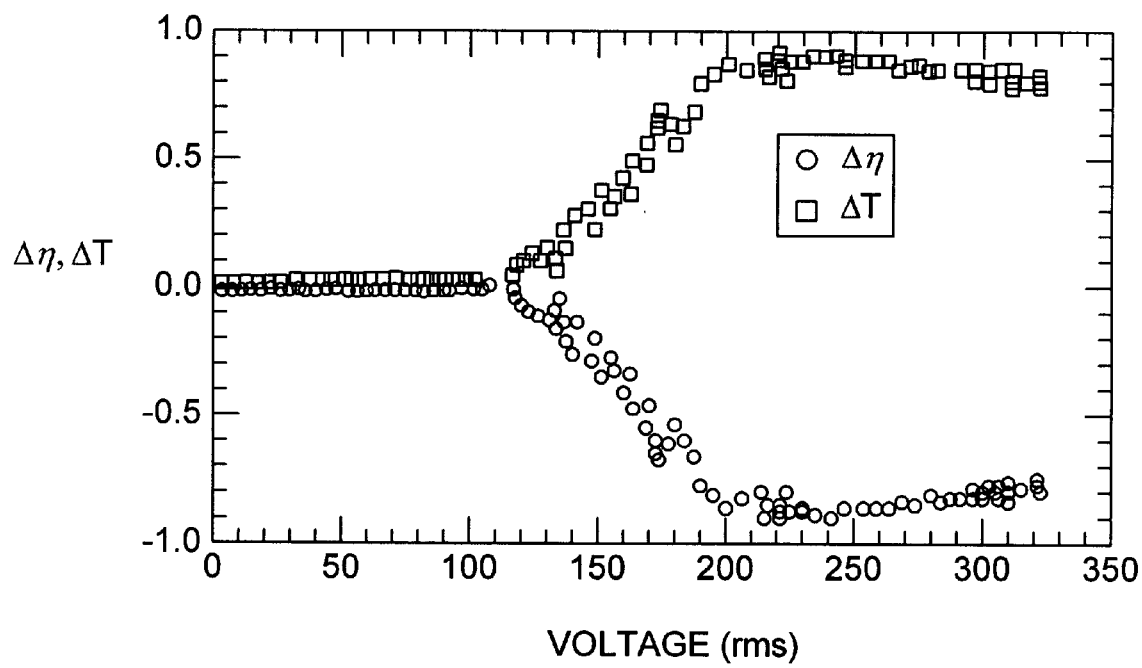
FIG. 2, is a graph of the normalized net transmittance and normalized net diffraction efficiency of a hologram (without the addition of a surfactant) versus the rms voltage applied across the hologram.

The scanning electron micrograph shown in FIG. 2 of the referenced *Applied Physics Letters* article and incorporated herein by reference is of the surface of a grating which was recorded in a sample with a 36 wt % loading of liquid crystal using the 488 nm line of an argon ion laser at an intensity of 95 mW/cm$^2$. The size of the liquid crystal domains is about 0.2 $\mu$m and the grating spacing is about 0.54 $\mu$m. This sample, which is approximately 20 $\mu$m thick, diffracts light in the Bragg regime.

FIG. 2 is a graph of the normalized net transmittance and normalized net diffraction efficiency of a hologram made according to the teachings of his disclosure versus the root mean square voltage ("Vrms") applied across the hologram. $\Delta\eta$ is the change in first order Bragg diffraction efficiency. $\Delta T$ is the change in zero order transmittance. FIG. 2 shows that energy is transferred from the first order beam to the zero-order beam as the voltage is increased. There is a true minimum of the diffraction efficiency at approximately 225 Vrms. The peak diffraction efficiency can approach 100%, depending on the wavelength and polarization of the probe beam, by appropriate adjustment of the sample thickness. The minimum diffraction efficiency can be made to approach 0% by slight adjustment of the parameters of the PDLC material to force the refractive index of the cured polymer to be equal to the ordinary refractive index of the liquid crystal.

Figure 3:
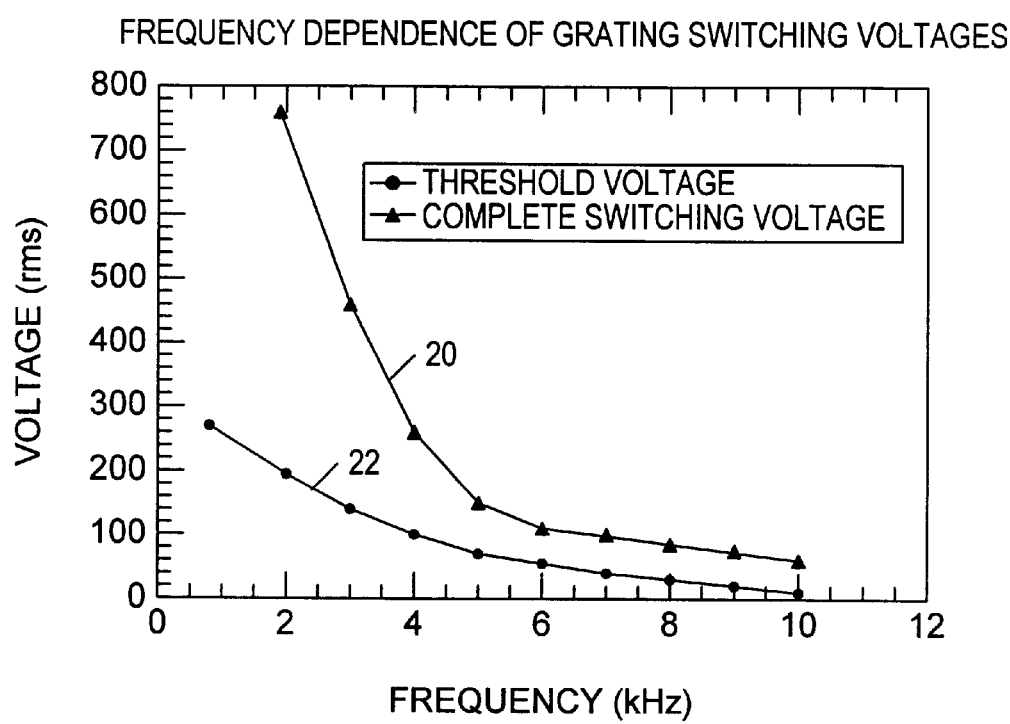
FIG. 3 is a graph of both the threshold and complete switching rms voltages needed for switching a hologram to minimum diffraction efficiency versus the frequency of the rms voltage.
Figure 4:
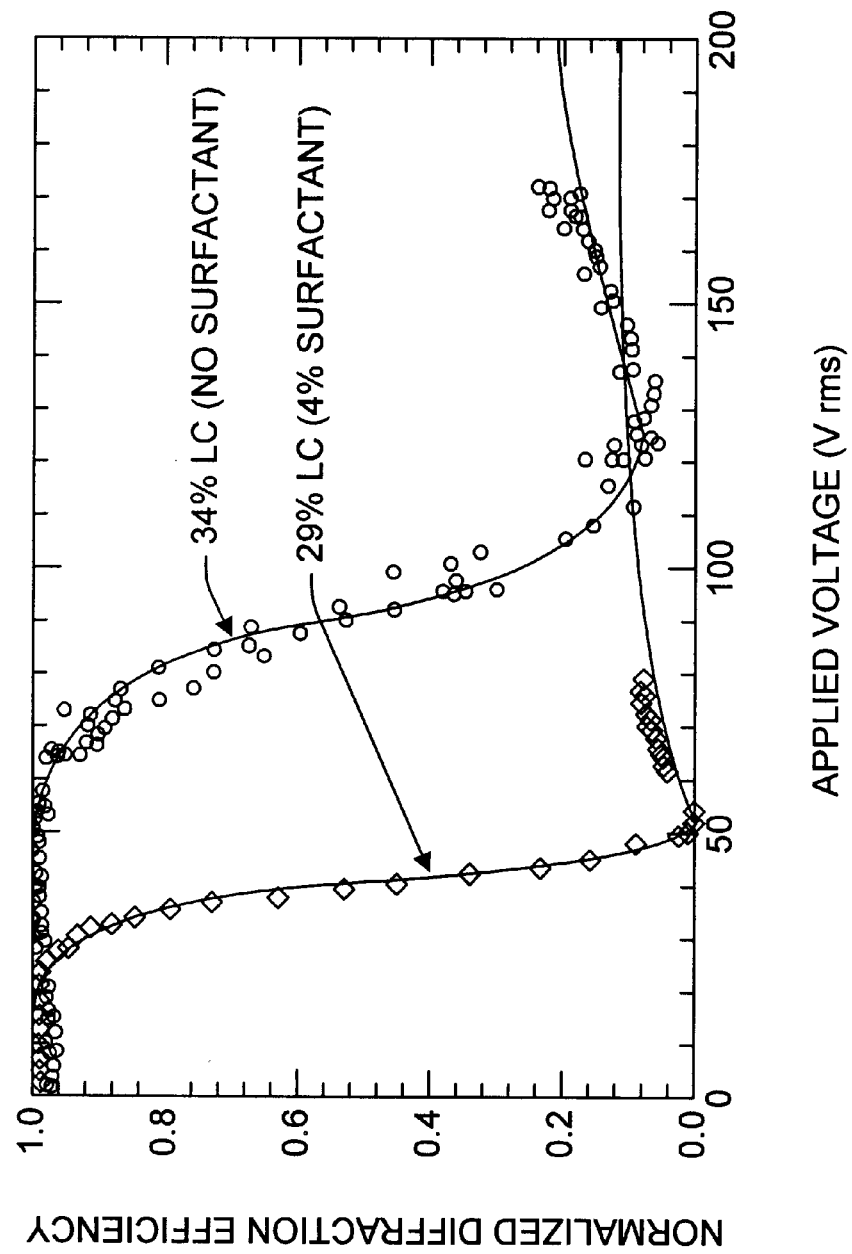
FIG. 4 is a graph of the normalized diffraction efficiency as a function of the applied electric field for a PDLC material formed with 34% by weight liquid crystal surfactant present and a PDLC material formed with 29% by weight liquid crystal and 4% by weight surfactant.

By increasing the frequency of the applied voltage, the switching voltage for minimum diffraction efficiency can be decreased significantly. This is illustrated in FIG. 3, which is a graph of both the threshold rms voltage 20 and the complete switching rms voltage 22 needed for switching a hologram made according to the teachings of this disclosure to minimum diffraction efficiency versus the frequency of the rms voltage. The threshold and complete switching rms voltages are reduced to 20 Vrms and 60 Vrms, respectively, at 10 kHz. Lower values are expected at even higher frequencies.

Figure 5:
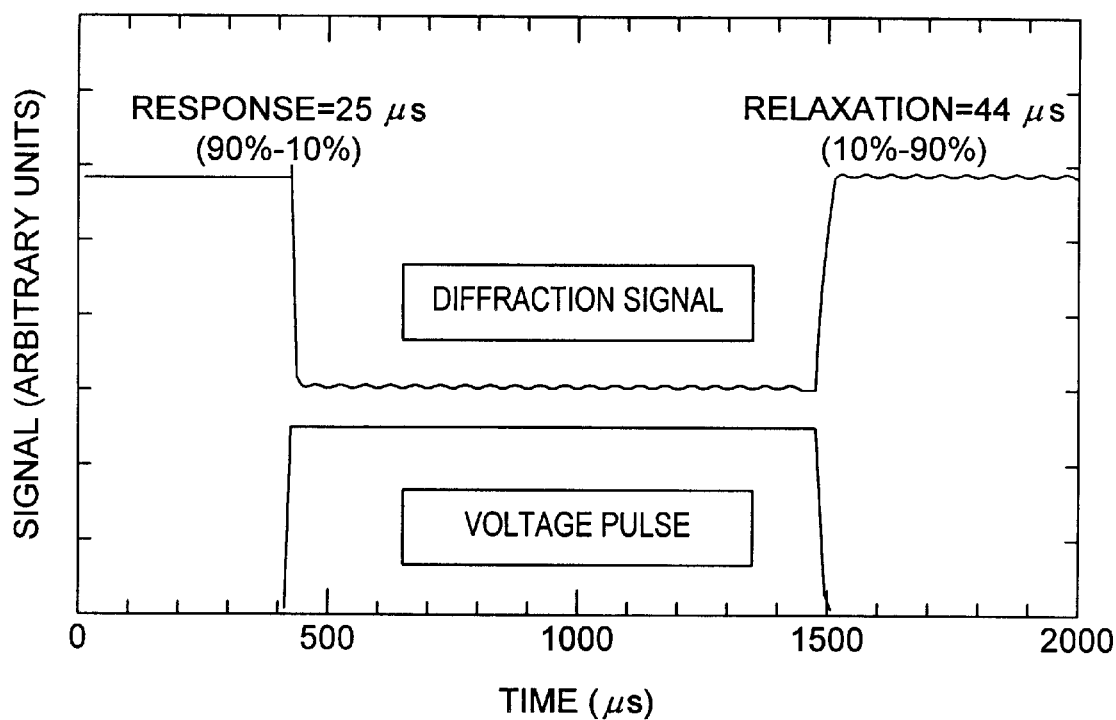
FIG. 5 is a graph showing the switching response time data for the diffracted beam in the surfactant-containing PDLC material in FIG. 4.

Smaller liquid crystal droplet sizes have the problem that it takes high switching voltages to switch their orientation. As described in the previous paragraph, using alternating current switching voltages at high frequencies helps reduce the needed switching voltage. As demonstrated in FIG. 4, it has been found that adding a surfactant (e.g., octanoic acid) the prepolymer material in amounts of about 4%–6% by weight of the total mixture results in sample holograms with switching voltages near 50 Vrms at lower frequencies of 1–2 kHz. As shown in FIG. 5, it has also been found that the use of the surfactant with the associated reduction in droplet size, reduces the switching time of the PDLC materials. Thus, samples made with surfactant can be switched on the order of 25–44 microseconds. Without wishing to be bound by any theory, the surfactant is believed to reduce switching voltages by reducing the anchoring of the liquid crystals at the interface between liquid crystal and cured polymer.

Figure 6:
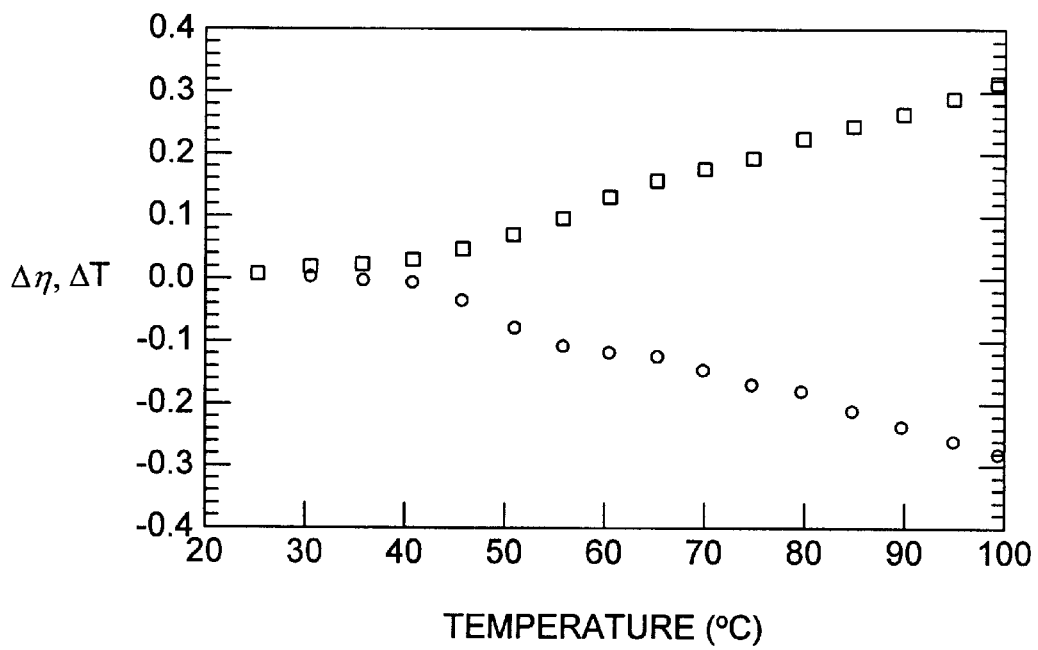
FIG. 6 is a graph of the normalized net transmittance and the normalized net diffraction efficiency of a hologram.

Thermal control of diffraction efficiency is illustrated in FIG. 6. FIG. 6 is a graph of the normalized net transmittance and normalized net diffraction efficiency of a hologram made according to the teachings of this disclosure versus temperature.

The polymer dispersed liquid crystal materials described herein successfully demonstrate the utility for recording volume holograms of a particular composition for such polymer dispersed liquid crystal systems.

Figure 7:
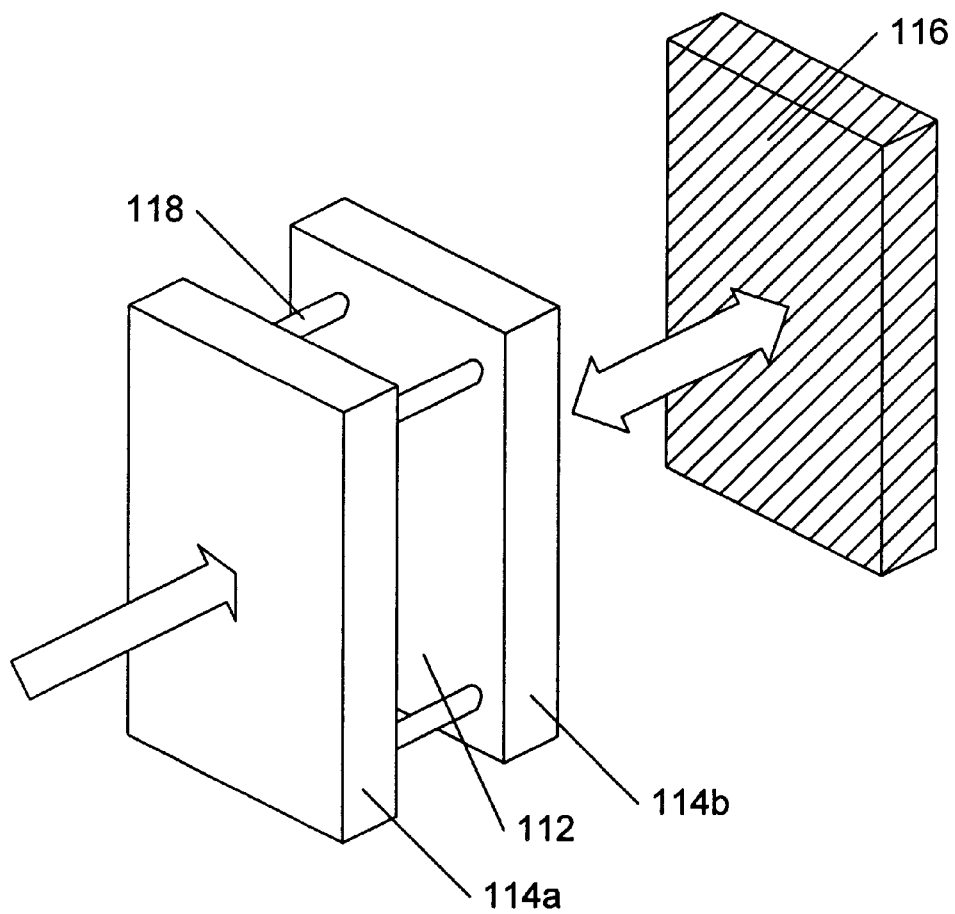
FIG. 7 is an elevational view of typical experimental arrangement for recording reflection gratings.

As shown in FIG. 7, a PDLC reflection grating is prepared by placing several drops of the mixture of prepolymer material 112 on an indium-tin oxide coated glass slide 114a. A second indium-tin oxide coated slide 114b is then pressed against the first, thereby causing the prepolymer material 112 to fill the region between the slides 114a and 114b. Preferably, the separation of the slides is maintained at approximately 20 μm by utilizing uniform spacers 118. Preparation, mixing and transfer of the prepolymer material is preferably done in the dark. Once assembled, a mirror 116 may be placed directly behind the glass plate 114b. The distance of the mirror from the sample is preferably substantially shorter than the coherence length of the laser. The PDLC material is preferably exposed to the 488 nm line of an argon-ion laser, expanded to fill the entire plane of the glass plate, with an intensity of approximately 0.1–100 m Watts/cm$^2$ with typical exposure times of 30–120 seconds. Constructive and destructive interference within the expanded beam establishes a periodic intensity profile through the thickness of the film.

In one embodiment, the prepolymer material utilized to make a reflection grating comprises a monomer, a liquid crystal, a cross-linking monomer, a coinitiator, and a photoinitiator dye. The reflection grating may be formed from prepolymer material comprising by total weight of the monomer dipentaerythritol hydroxypentacrylate (DPHA), 35% by total weight of a liquid crystal comprising a mixture of cyano biphenyls (known commercially as "E7"), 10% by total weight of a cross-linking monomer comprising N-vinylpyrrolidinone ("NVP"), 2.5% by weight of the coinitiator N-phenylglycine ("NPG"), and $10^{-5}$ to $10^{-6}$ gram moles of a photoinitiator dye comprising rose bengal ester. Further, as with transmission gratings, the addition of surfactants is expected to facilitate the same advantageous properties discussed above in connection with transmission gratings. It is also expected that similar ranges and variation of prepolymer starting material will find ready application in the formation of suitable reflection gratings.

It has been determined by low voltage, high resolution scanning electron microscopy ("LVHRSEM") that the resulting material comprises a fine grating with a periodicity of 165 nm with the grating vector perpendicular to the plane of the surface. Thus, as shown schematically in FIG. 8a, grating 130 includes periodic planes of polymer channels 130a and PDLC channels 130b which run parallel to the front surface 134. The grating spacing associated with these periodic planes remains relatively constant throughout the full thickness of the sample from the air/film to the film/substrate interface.

Although interference is used to prepare both transmission and reflection gratings, the morphology of the reflection grating differs significantly. In particular, it has been determined that, unlike transmission gratings with similar liquid crystal concentrations, very little coalescence of individual droplets was evident. Further more, the droplets that were present in the material were significantly smaller having diameters between 50 and 100 nm. Furthermore, unlike transmission gratings where the liquid crystal-rich regions typically comprise less than 40% of the grating, the liquid crystal-rich component of a reflection grating is significantly larger. Due to the much smaller periodicity associated with reflection gratings, i.e., a narrower grating spacing (~0.2 microns), it is believed that the time difference between completion of curing in high intensity versus low intensity regions is much smaller. It is also believed that the fast polymerization, as evidenced by small droplet diameters, traps a significant percentage of the liquid crystal in the matrix during gelation and precludes any substantial growth of large droplets or diffusion of small droplets into larger domains.

Analysis of the reflection notch in the absorbance spectrum supports the conclusion that a periodic refractive index modulation is disposed through the thickness of the film. In PDLC materials that are formed with the 488 nm line of an argon ion laser, the reflection notch typically has a reflection wavelength at approximately 472 nm for normal incidence and a relatively narrow bandwidth. The small difference between the writing wavelength and the reflection wavelength (approximately 5%) indicates that shrinkage of the film is not a significant problem. Moreover, it has been found that the performance of such gratings is stable over periods of many months.

In addition to the materials utilized in the one embodiment described above, it is believed that suitable PDLC materials could be prepared utilizing monomers such as triethyleneglycol diacrylate, trimethylolpropanetriacrylate, pentaerythritol triacrylate, pentaerythritol tetracrylate, pentaerythritol pentacrylate, and the like. Similarly, other coinitiators such as triethylamine, triethanolamine, N,N-dimethyl-2,6-diisopropylaniline, and the like could be used instead of N-phenylglycine. Where it is desirable to use the 458 nm, 476 nm, 488 nm or 514 nm lines of an argon ion laser, that the photoinitiator dyes rose bengal sodium salt, eosin, eosin sodium salt, fluorescein sodium salt and the like will give favorable results. Where the 633 nm line is utilized, methylene blue will find ready application. Finally, it is believed that other liquid crystals such as 4'-pentyl-4-cyanobiphenyl or 4'-heptyl-4-cyanobiphenyl, can be utilized.

Figure 8A:
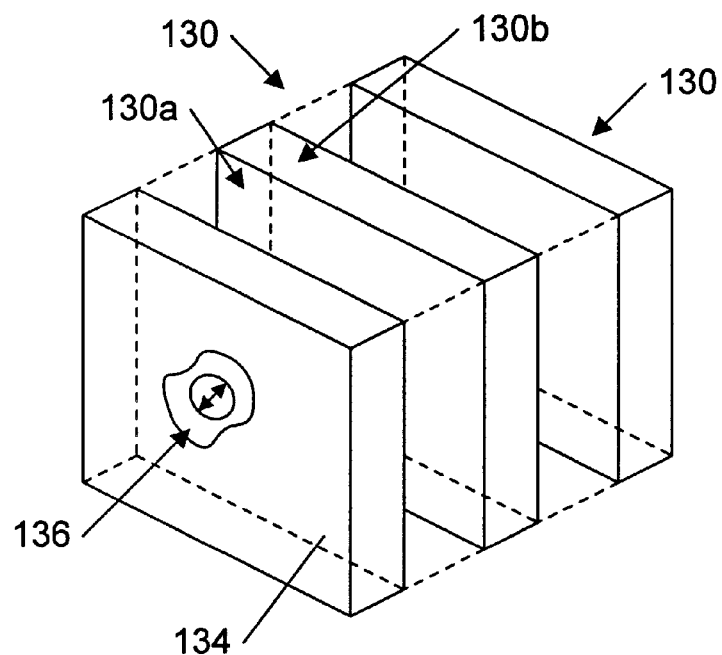
FIG. 8a and FIG. 8b are elevational views of a reflection grating having periodic planes of polymer channels and PDLC channels disposed parallel to the front surface in the absence of a field (FIG. 8a) and with an electric field applied (FIG. 8b) wherein the liquid-crystal utilized in the formation of the grating has a positive dielectric anisotropy.
Figure 8B:
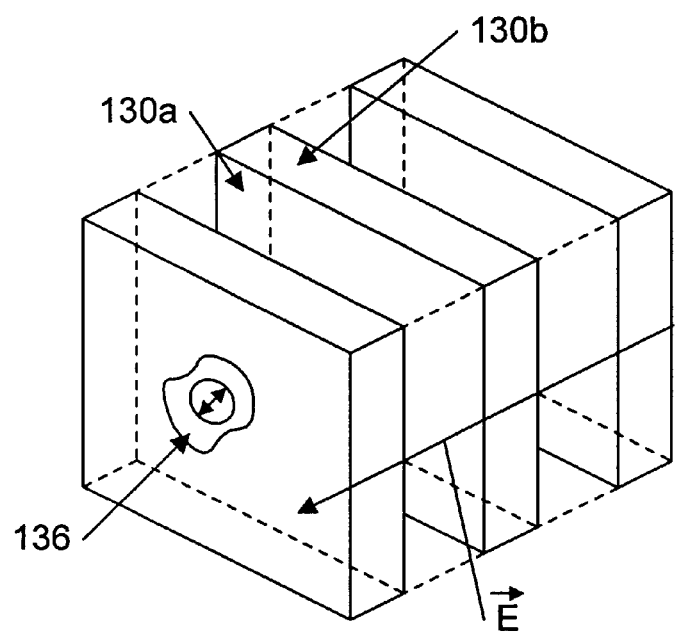

Referring again to FIG. 8a, there is shown an elevational view of a reflection grating 130 made in accordance with this disclosure having periodic planes of polymer channels 130a and PDLC channels 130b disposed parallel to the front surface 134 of the grating 130. The symmetry axis 136 of the liquid crystal domains is formed in a direction perpendicular to the periodic channels 130a and 130b of the grating 130 and perpendicular to the front surface 134 of the grating 130. Thus, when an electric field E is applied, as shown in FIG. 8b, the symmetry axis 136 is already in a low energy state in alignment with the field E and will reorient. Thus, reflection gratings formed in accordance with the procedure described above will not normally be switchable.

In general, a reflection grating tends to reflect a narrow wavelength band, such that the grating can be used as a reflection filter. In one embodiment, however, the reflection grating is formed so that it will be switchable. More particularly, switchable reflection gratings can be made utilizing negative dielectric anisotropy LCs (or LCs with a low cross-over frequency), an applied magnetic field, an applied shear stress field, or slanted gratings.

Figure 9A:
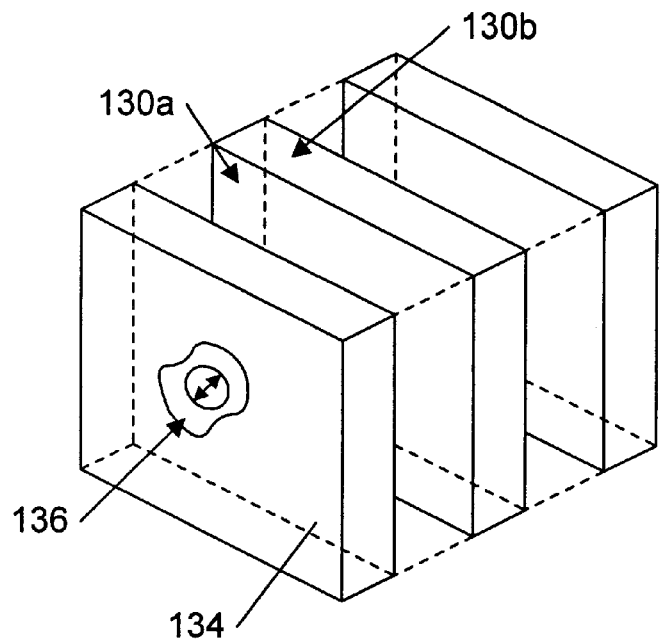
FIG. 9a and FIG. 9b are elevational views of a reflection grating having periodic planes of polymer channels and PDLC channels disposed parallel to the front surface of the grating in the absence of an electric field (FIG. 9a) and with an electric field applied (FIG. 9b) wherein the liquid crystal utilized in the formation of the grating has a negative dielectric anisotropy.
Figure 9B:
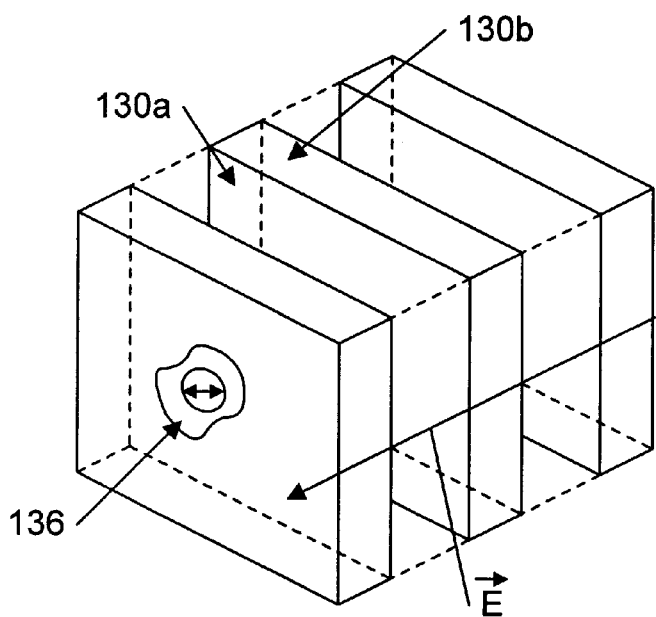

It is known that liquid crystals having a negative dielectric anisotropy (Δε) will rotate in a direction perpendicular to an applied field. As shown in FIG. 9a, the symmetry axis 136 of the liquid crystal domains formed with a liquid crystal having a negative Δε will also be disposed in a direction perpendicular to the periodic channels 130a and 130b of the grating 130 and to the front surface 135 of the grating. However, when an electric field E is applied across such gratings, as shown in FIG. 9b, the symmetry axis of the negative Δε liquid crystal will distort and reorient in a direction perpendicular to the field E, which is perpendicular to the film and the periodic planes of the grating. As a result, the reflection grating can be switched between a state where it is reflective and a state where it is transmissive. The following negative Δε liquid crystals and others are expected to find ready applications in the methods and devises of the present invention:

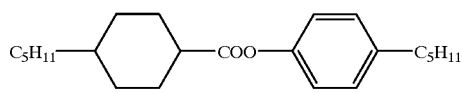

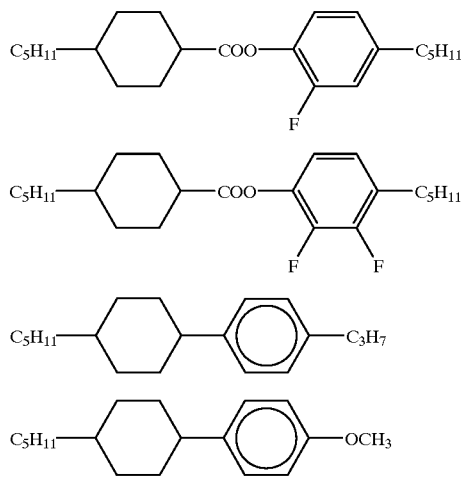

Liquid crystals can be found in nature (or synthesized) with either positive or negative Δε. Thus, it is possible to use a LC which has a positive Δε at low frequencies, but becomes negative at high frequencies. The frequency (of the applied voltage) at which Δε changes sign is called the cross-over frequency. The cross-over frequency will vary with LC composition, and typical values range from 1–10 kHz. Thus, by operating at the proper frequency, the reflection grating may be switched. It is expected that low crossover frequency materials can be prepare d from a combination of positive and negative dielectric anisotropy liquid crystals. A suitable positive dielectric liquid crystal for use in such a combination contains four ring esters as shown below:

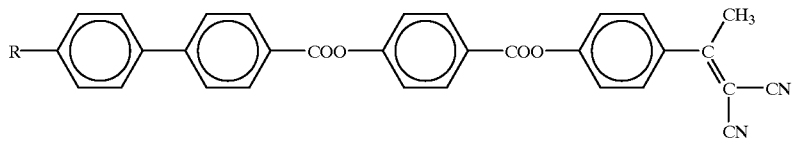

A strongly negative dielectric liquid crystal suitable for use in such a combination is made up of pyridazines as shown below:

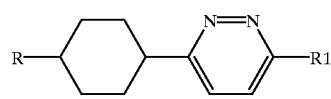

Both liquid crystal materials are available from LaRoche & Co., Switzerland. By varying the proportion of the positive and negative liquid crystals in the combination, crossover frequencies form 1.4–2.3 kHz are obtained at room temperature. Another combination suitable for use in the present embodiment is a combination of the following: p-pentylphenyl-2-chloro-4-(p-pentylbenzoyloxy) benzoate and benzoate. These materials are available from Kodak Company.

Figure 10A:
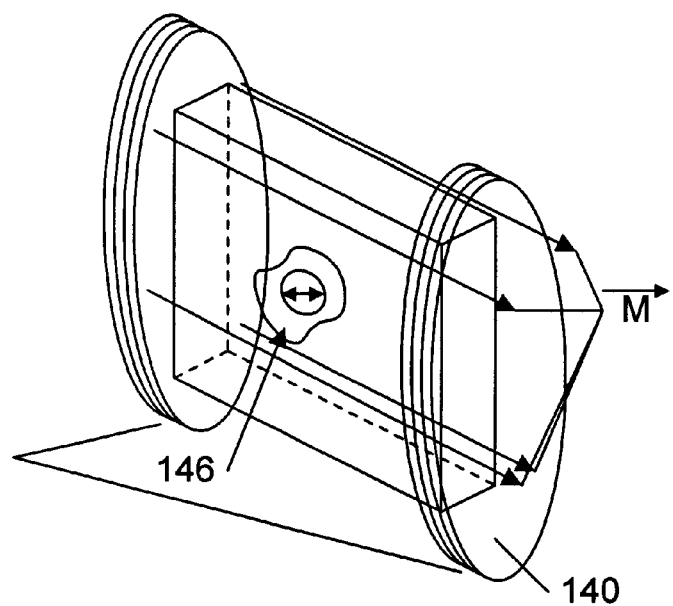
FIG. 10a is an elevational view of a reflection grating disposed within a magnetic field generated by Helmholtz coils.
Figure 10B:
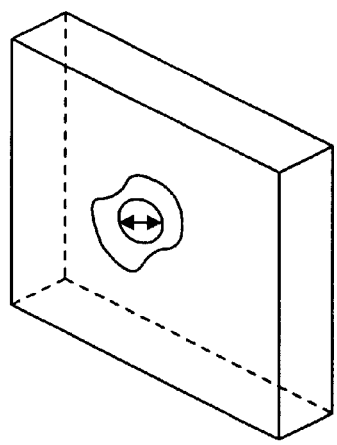
FIG. 10b and FIG. 10c are elevational views of the reflection grating of FIG. 10a in the absence of an electric field (FIG. 10b) and with an electric field applied (FIG. 10c)
Figure 10C:
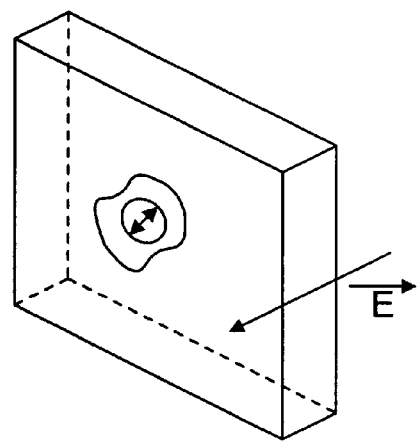

In still more detailed aspects, switchable reflection gratings can be formed using positive Δε liquid crystals. As shown in FIG. 10a, such gratings are formed by exposing the PDLC starting material to a magnetic field during the curing process. The magnetic field can be generated by the use of Helmholtz coils (as shown in FIG. 10a), the use of a permanent magnet, or other suitable means. Preferably, the magnetic field M is oriented parallel to the front surface of the glass plates (not shown) that are used to form the grating 140. As a result, the symmetry axis 146 of the liquid crystals will orient along the field while the mixture is fluid. When polymerization is complete, the field may be removed and the alignment of the symmetry axis of the liquid crystals will remain unchanged. (See FIG. 10b.) When an electric field is applied, as shown in FIG. 10c the positive Δε liquid crystal will reorient in the direction of the field, which is perpendicular to the front surface of grating and to the periodic channels of the grating.

FIG. 11a depicts a slanted transmission grating 148 and FIG. 11b depicts a slanted reflection grating 150. A holographic transmission grating is considered slanted if the direction of the grating vector G is not parallel to the grating surface. In a holographic reflection grating, the grating is said to be slanted if the grating vector G is not perpendicular to the grating surface. Slanted gratings have many of the same uses as nonslanted grating such as visual displays, mirrors, line filters, optical switches, and the like.

Primarily, slanted holographic gratings are used to control the direction of a diffracted beam. For example, in reflection holograms a slanted grating is used to separate the specular reflection of the film from the diffracted beam. In a PDLC holographic grating, a slanted grating has an even more useful advantage. The slant allows the modulation depth of the grating to be controlled by an electric field when using either tangential or homeotropic aligned liquid crystals. This is because the slant provides components of the electric field in the directions both tangent and perpendicular to the grating vector. In particular, for the reflection grating, the LC domain symmetry axis will be oriented along the grating vector G and can be switched to a direction perpendicular to the film plane by a longitudinally applied field E. This is the typical geometry for switching of the diffraction efficiency of the slanted reflection grating.

When recording slanted reflection gratings, it is desirable to place the sample between the hypotenuses of two right-angle glass prisms. Neutral density filters can then be placed in optical contact with the back faces of the prisms using index matching fluids so as to frustrate back reflections which would cause spurious gratings to also be recorded. The incident laser beam is split by a conventional beam splitter into two beams which are then directed to the front faces of the prisms, and then overlapped in the sample at the desired angle. The beams thus enter the sample from opposite sides. This prism coupling technique permits the light to enter the sample at greater angles. The slant of the resulting grating is determined by the angle which the prism assembly is rotated (i.e., the angle between the direction of one incident beam an the normal to the prism front face at which that beam enters the prism).

As shown in FIG. 12, switchable reflection gratings may be formed in the presence of an applied shear stress field. In this method, a shear stress would be applied along the direction of a magnetic field M. This could be accomplished, for example, by applying equal and opposite tensions to the two ITO coated glass plates which sandwich the prepolymer mixture while the polymer is still soft. This shear stress would distort the LC domains in the direction of the stress, and the resultant LC domain symmetry axis will be preferentially along the direction of the stress, parallel to the PDLC planes and perpendicular to the direction of the applied electric field for switching.

Reflection grating prepared in accordance with this description may find application in color reflective displays, switchable wavelength filters for laser protection, reflective optical elements and the like.

Figure 13:
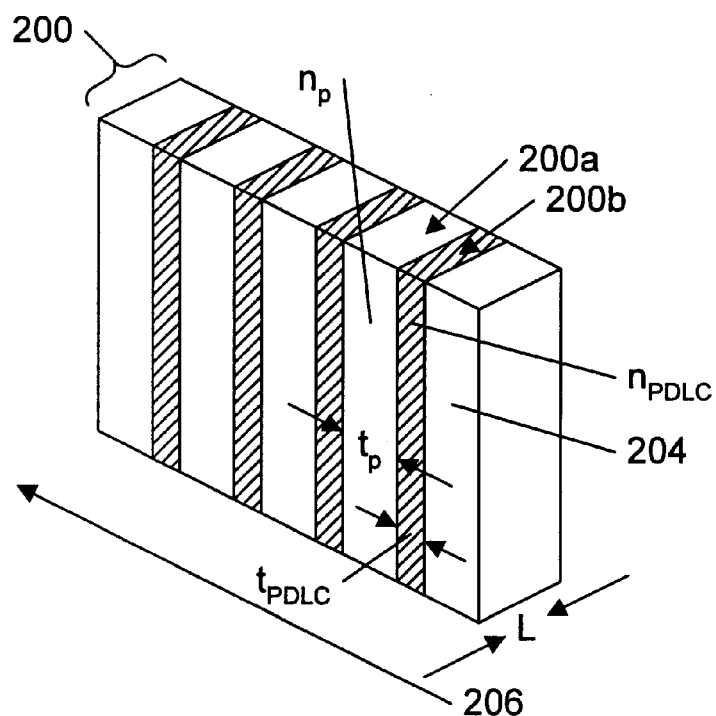
FIG. 13 is an elevational view of a subwavelength grating having periodic planes of polymer channels and PDLC channels disposed perpendicular to the front surface of the grating.

In one embodiment, PDLC materials can be made that exhibit a property known as form birefringence whereby polarized light that is transmitted through the grating will have its polarization modified. Such gratings are known as subwavelength gratings, and they behave like a negative uniaxial crystal, such as calcite, potassium dihydrogen phosphate, or lithium niobate, with an optic axis perpendicular to the PDLC planes. Referring now to FIG. 13, there is shown an elevational view of a transmission grating 200 made in accordance with this description having periodic planes of polymer planes 200a and PDLC planes 200b disposed perpendicular to the front surface 204 of the grating 200. The optic axis 206 is disposed perpendicular to polymer planes 200a and the PDLC planes 200b. Each polymer plane 200a has a thickness $t_p$ and refractive index $n_p$, and each PDLC plane 200b has a thickness $t_{PDLC}$ and refractive index $n_{PDLC}$.

Where the combined thickness of the PDLC plane and the polymer plane is substantially less than an optical wavelength (i.e. $(t_{PDLC}+t_p)<<\lambda$), the grating will exhibit form birefringence. As discussed below, the magnitude of the shift in polarization is proportional to the length of the grating. Thus, by carefully selecting the length, L, of the subwavelength grating for a given wavelength of light, one can rotate the plane of polarization or create circularly polarized light. Consequently, such subwavelength gratings can be designed to act as a half-wave or quarter-wave plate, respectively. Thus, an advantage of this process is that the birefringence of the material may be controlled by simple design parameters and optimized to a particular wavelength, rather than relying on the given birefringence of any material at that wavelength.

To form a half-wave plate, the retardance of the subwavelength grating must be equal to one-half of a wavelength, i.e. retardance=λ/2, and to form a quarter-wave plate, the retardance must be equal to one-quarter of a wavelength, i.e. retardance=λ/4. It is known that the retardance is related to the net birefringence, |Δn|, which is the difference between the ordinary index of refraction, $n_o$, and the extraordinary index of refraction $n_e$, of the sub-wavelength grating by the following relation:

Retardance=|Δn |L=|$n_e$−$n_o$|L

Thus, for a half-wave plate, i.e. a retardation equal to one-half of a wavelength, the length of the subwavelength grating should be selected so that:

L=λ/(2|Δn |)

Similarly, for a quarter-wave plate, i.e. a retardance equal to one-quarter of a wavelength, the length of the subwavelength grating should be selected so that:

L=λ/(4|Δn |)

Figure 14A:
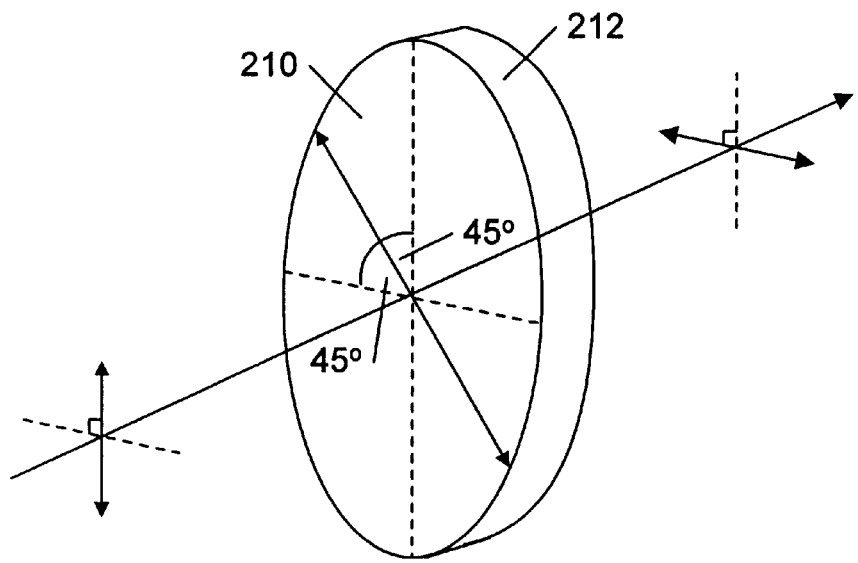
FIG. 14a is an elevational view of a switchable subwavelength wherein the subwavelength grating functions as a half wave plate whereby the polarization of the incident radiation is rotated by 90°.
Figure 14B:
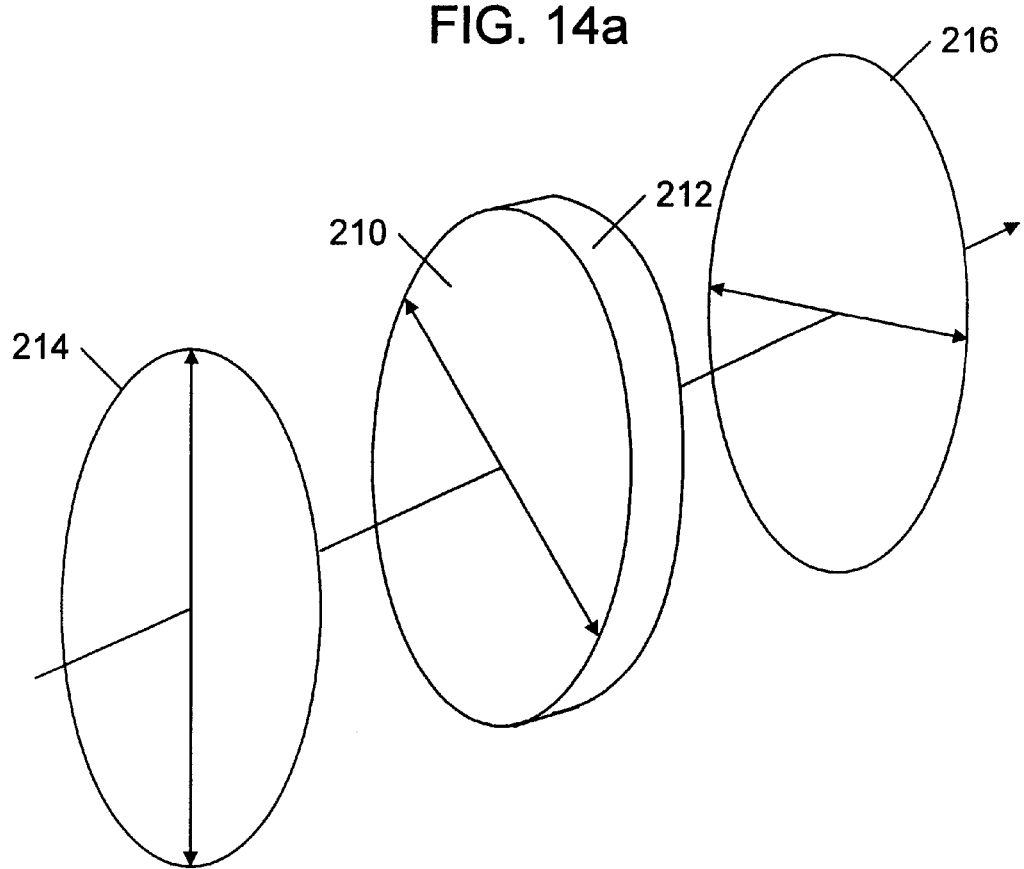
FIG. 14b is an elevational view of the switchable half wave plate shown in FIG. 14a disposed between crossed polarizers whereby the incident light is transmitted.
Figure 14C:
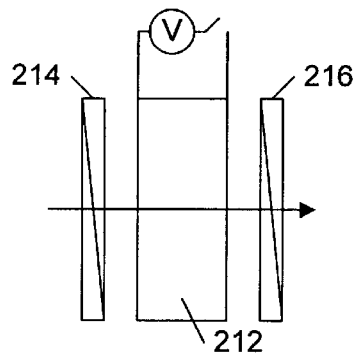
FIG. 14c and FIG. 14d are side views of the switchable half wave plate and crossed polarizes shown in FIG. 14b and showing the effect of the application of a voltage to the plate whereby the polarization of the light is no longer rotated and thus blocked by the second polarizer.
Figure 14D:
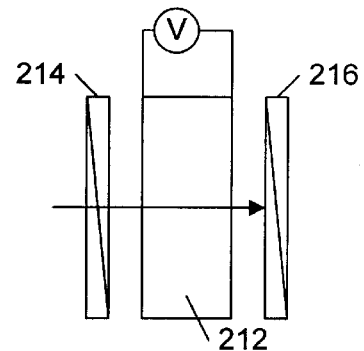

If, for example, the polarization of the incident light is at an angle of 45° with respect to the optic axis 210 of a half-wave plate 212, as shown in FIG. 14a, the plane polarization will be preserved, but the polarization of the wave exiting the plate will be shifted by 90°. Thus, referring now to FIG. 14b and 14c, where the half-wave plate 212 is placed between cross polarizers 214 and 216, the incident light will be transmitted. If an appropriate switching voltage is applied, as shown in FIG. 14d, the polarization of the light is not rotated and the light will be blocked by the second polarizer.

Figure 15A:
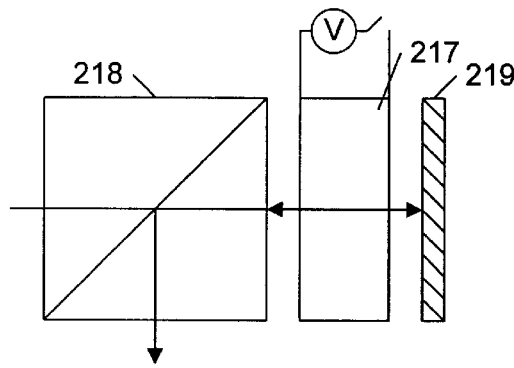
FIG. 15a is a side view of a switchable subwavelength grating wherein the subwavelength grating functions as a quarter wave plate whereby plane polarized light is transmitted through the subwavelength grating, retroreflected by a mirror and reflected by the beam splitter.
Figure 15B:
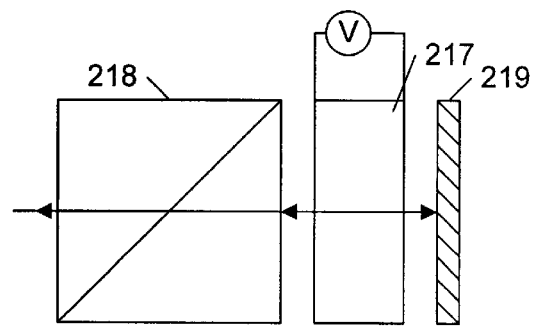
FIG. 15b is a side view of the switchable subwavelength grating of FIG. 15a and showing the effect of the application of a voltage to the plate whereby the polarization of the light is no longer modified, thereby permitting the reflected light to pass through he beam splitter.

For a quarter wave plate plane polarized light is converted to circularly polarized light. Thus, referring now to FIG. 15a, where quarter wave plate 217 is placed between a polarizing beam splitter 218 and a mirror 219, the reflected light will be reflected by the beam splitter 218. If an appropriate switching voltage is applied, as shown in FIG. 15b, the reflected light will pass through the beam splitter and be retroreflected on the incident beam.

Figure 16A:
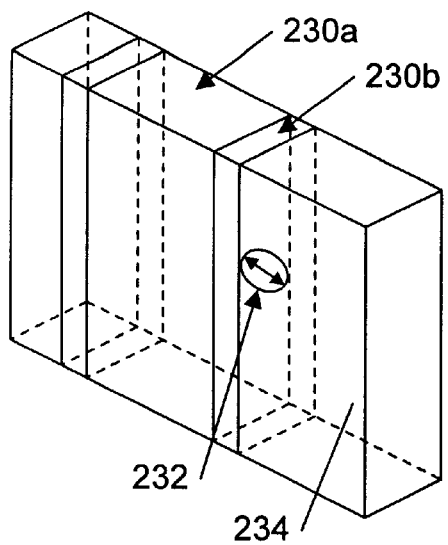
FIG. 16a and FIG. 16b are elevational views of a transmission grating having periodic planes of polymer channels and PDLC channels disposed perpendicular to the front face of the grating in the absence of an electric field (FIG. 16a) and with an electric field applied (FIG. 16b) wherein the liquid crystal utilized in formation of the grating has a positive dielectric anisotropy.
Figure 16B:
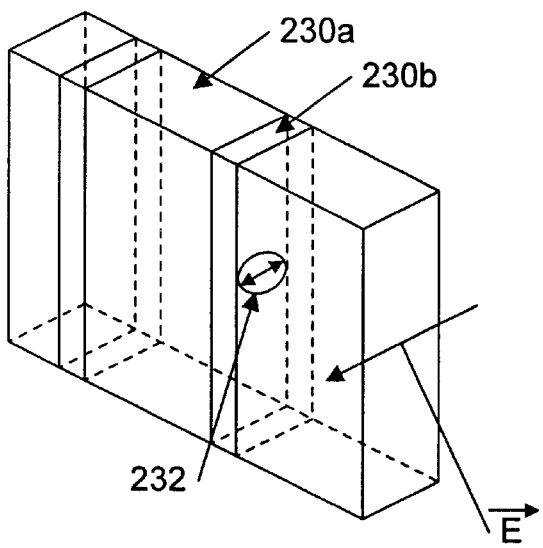

Referring now to FIG. 16a, there is shown an elevational view of a subwavelength grating 230 recorded in accordance with the above-described methods and having periodic planes of polymer channels 230a and PDLC channels 230b disposed perpendicular to the front surface 234 of grating 230. As shown in FIG. 16a, the symmetry axis 232 of the liquid crystal domains is disposed in a direction parallel to the front surface 234 of the grating and perpendicular to the periodic channels 230a and 230b of the grating 230. Thus, when an electric field E is applied across the grating, as shown in FIG. 15b, the symmetry axis 232 distorts and reorients in a direction along the field E, which is perpendicular to the front surface 234 of the grating and parallel to the periodic channels 230a and 230b of the grating 230. As a result, subwavelength grating 230 can be switched between a state where it changes the polarization of the incident radiation and a state in which it does not. Without wishing to be bound by any theory, it is currently believed that the direction of the liquid crystal domain symmetry 232 is due to a surface tension gradient which occurs as a result of the anisotropic diffusion of monomer and liquid crystal during recording of the grating and that this gradient causes the liquid crystal domain symmetry to orient in a direction perpendicular to the periodic planes.

As discussed in Born and Wolf, Principles of Optics, 5$^{th}$ Ed., New York (1975), incorporated herein by reference, the birefringence of a subwavelength grating is given by the following relation:

$$n_e^2 - n_o^2 = -[(f_{PDLC})(f_p)(n_{PDLC}^2 - n_p^2)]/[f_{PDLC}\, n_{PDLC}^2 + f_p n_p^2]$$

Where:
  $n_o$=the ordinary index of refraction of the subwavelength grating;
  $n_e$=the extraordinary index of refraction;
  $n_{PDLC}$=the refractive index of the PDLC plane;
  $n_p$=the refractive index of the polymer plane
  $n_{LC}$=the effective refractive index of the liquid crystal seen by an incident optical wave;
  $f_{PDLC} = t_{PDLC}/(t_{PDLC} + t_P)$
  $f_P = t_P/(t_{PDLC} + t_P)$ Thus, the net birefringence of the subwavelength grating will be zero if $n_{PDLC} = n_P$.

It is known that the effective refractive index of the liquid crystal, $n_{LC}$, is a function of the applied electric field, having a maximum when the field is zero and value equal to that of the polymer, $n_P$, at some value of the electric field, $E_{MAX}$. Thus, by application of an electric field, the refractive index of the liquid crystal, $n_{LC}$, and, hence, the refractive index of the PDLC plane can be altered. Using the relationship set forth above, the net birefringence of a subwavelength grating will be a minimum when $n_{PDLC}$ is equal to $n_P$, i.e. when $n_{LC} = n_P$. Therefore, if the refractive index of the PDLC plane can be matched to the refractive index of the polymer plane, i.e. $n_{PDLC} = n_P$, by the application of an electric field, the birefringence of the subwavelength grating can be switched off.

The following equation for net birefringence, i.e. $|\Delta n| = |n_e - n_o|$, follows from the equation given in Born and Wolf (reproduced above):

$$\Delta n = -[(f_{PDLC})(f_p)(n_{PDLC}^2 - n_p^2)]/[2n_{AVG}\,(f_{PDLC}\,n_{PDLC}^2 + f_p n_p^2)]$$

where $n_{AVG} = (n_e + n_o)/2$.

Furthermore, it is known that the refractive index of the PDLC plane $n_{PDLC}$ is related to the effective refractive index of the liquid crystal seen by an incident optical wave, $n_{LC}$, and the refractive index of the surrounding polymer plane, $n_P$, by the following relation:

$$N_{PDLC} = n_P + f_{LC}[n_{LC} - n_P]$$

Where fLC is the volume fraction of liquid crystal dispersed in the polymer within the PDLC plane, $f_{LC} = [V_{LC}/(V_{LC} + V_P)]$.

By way of example, a typical value for the effective refractive index for the liquid crystal in the absence of an electric field is $n_{LC} = 1.7$, and for the polymer layer $n_P = 1.5$. For the grating where the thickness of the PDLC planes and the polymer planes are equal (i.e. $t_{PDLC} = t_P$, $f_{PDLC} = 0.5 = f_P$) and $f_{LC} = 0.35$, the net birefringence, $\Delta n$, of the subwavelength grating is approximately 0.008. Thus, where the incident light has a wavelength of 0.8 µm, the length of the subwavelength grating should be 50 µm for a half-wave plate and a 25 µm for a quarter-wave plate. Furthermore, by application of an electric field of approximately 5 V/µm, the refractive index of the liquid crystal can be matched to the refractive index of the polymer and the birefringence of the subwavelength grating turned off. Thus, the switching voltage, $V_n$, for a half-wave plate is on the order of 250 volts, and for a quarter-wave plate approximately 125 volts.

By applying such voltages, the plates can be switched between the on and off (zero retardance) states on the order of microseconds. As a means of comparison, current Pockels cell technology can be switched in nanoseconds with voltages of approximately 1000–2000 volts, and bulk nematic liquid crystals can be switched on the order of milliseconds with voltages of approximately 5 volts.

Figure 17:
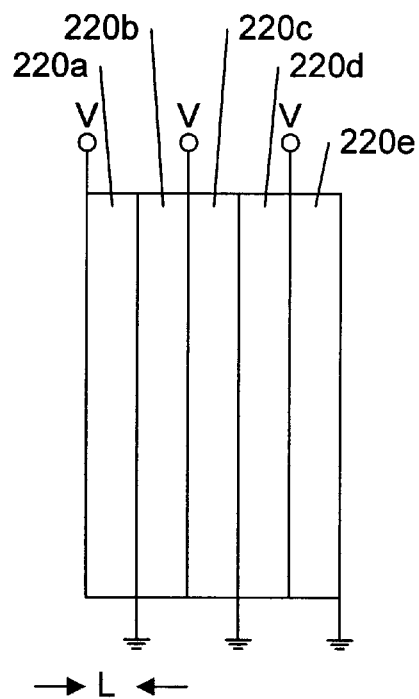
FIG. 17 is a side view of five subwavelength gratings wherein the gratings are stacked and connected electrically in parallel thereby reducing the switching voltage of the subwavelength grating.

In an alternative embodiment, as shown in FIG. 17, the switching voltage of the subwavelength grating can be reduced by stacking several subwavelength gratings 220a–220e together, and connecting them electrically in parallel. By way of example, it has been found that a stack of five gratings each with a length of 10 µm yields the thickness required for a half-wave plate. It should be noted that the length of the sample is somewhat greater than 50 µm, because each grating includes an indium-tin-oxide coating which acts as a transparent electrode. The switching voltage for such a stack of plates, however, is only 50 volts.

Subwavelength gratings in accordance with the this description are expected to find suitable application in the areas of polarization optics and optical switches for displays and laser optics, as well as tunable filters for telecommunications, colorimetry, spectroscopy, laser protection, and the like. Similarly, electrically switchable transmission gratings have many applications for which beams of light must be deflected or holographic images switched. Among these applications are: Fiber optic switches, reprogrammable N×N optical interconnects for optical computing, beam steering for laser surgery, beam steering for laser radar, holographic image storage and retrieval, digital zoom optics (switchable holographic lenses), graphic arts and entertainment, and the like.

In a preferred embodiment, a switchable hologram is one for which the diffraction efficiency of the hologram may be modulated by the application of an electric field, and can be switched from a fully on state (high diffraction efficiency) to a fully off state (low or zero diffraction efficiency). A static hologram is one whose properties remain fixed independent of an applied field. In accordance with this description, a high contrast status hologram can also be created. In this variation of this description, the holograms are recorded as described previously. The cured polymer film is then soaked in a suitable solvent at room temperature for a short duration and finally dried. For the liquid crystal E7, methanol has shown satisfactory application. Other potential solvents include alcohols such as ethanol, hydrocarbons such as hexane and heptane, and the like. When the material is dried, a high contrast status hologram with high diffraction efficiency results. The high diffraction efficiency is a consequence of the large index modulation in the film ($\Delta n$~0.5) because the second phase domains are replaced with empty (air) voids (n~1).

Similarly, in accordance with this description a high birefringence static sub-wavelength wave-plate can also be formed. Due to the fact that the refractive index for air is significantly lower than for most liquid crystals, the corresponding thickness of the half-wave plate would be reduced accordingly. Synthesized wave-plates in accordance with this description can be used in many applications employing polarization optics, particularly where a material of the appropriate birefringence at the appropriate wavelength is unavailable, too costly, or too bulky.

The term polymer dispersed liquid crystals and polymer dispersed liquid crystal material includes, as may be appropriate, solutions in which none of the monomers have yet polymerized or cured, solutions in which some polymerization has occurred, and solutions which have undergone complete polymerization. Those of skill in the art will clearly understand that the use herein of the standard term used in the art, polymer dispersed liquid crystals (which grammatically refers to liquid crystals dispersed in a fully polymerized matrix) is meant to include all or part of a more grammatically correct prepolymer dispersed liquid crystal material or a more grammatically correct starting material for a polymer dispersed liquid crystal material.

Figure 18:
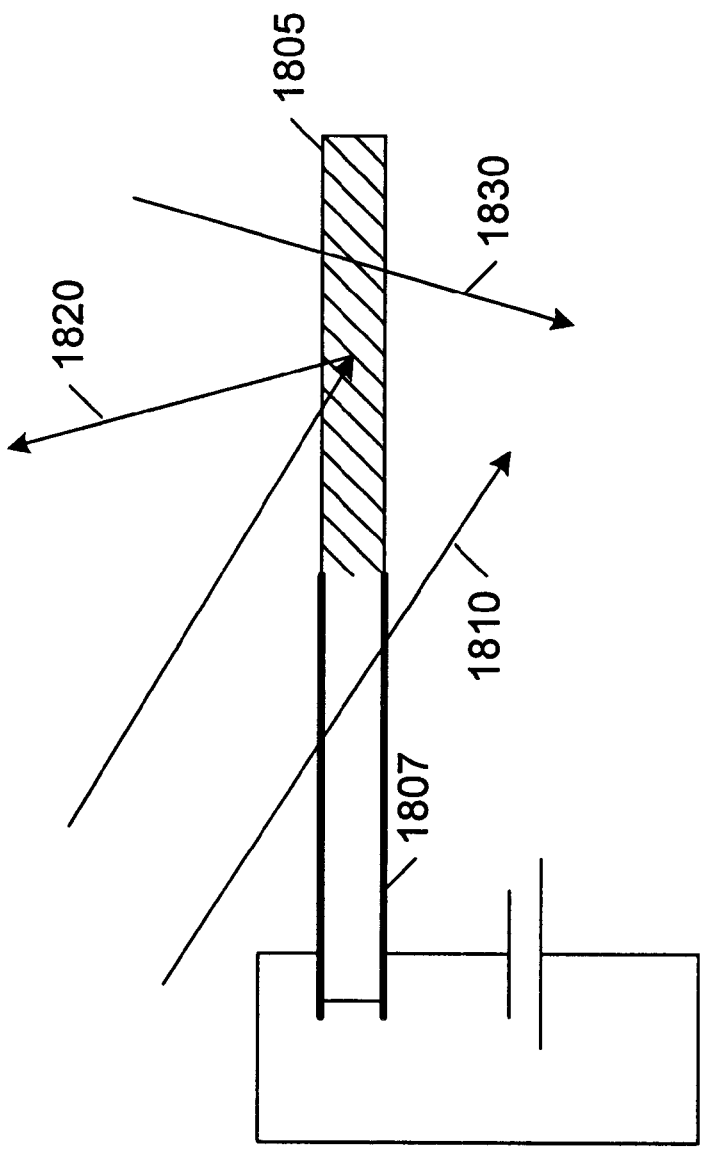
FIG. 18 shows a switchable holographic optical element that can be selectively made transparent.

FIG. 18: Switchable Holographic Optical Element.

FIG. 18 shows one embodiment of a switchable holographic optical element (HOE) in operation. In this diagram, an electric field is applied across a part of switchable HOE 1805 through electrode plates 1807. The electric field renders the HOE transparent by effectively erasing the grating structure from the HOE. The portion of switchable HOE 1805 not exposed to the electric field from electrodes 1807 still functions as a hologram since its grating structure, indicated by the hash marks in the figure, is intact. A ray of light 1820 of the appropriate color and at an appropriate incidence angle is diffracted by this portion of HOE 1805. A ray of light 1810 that is incident upon the portion of switchable HOE 1805 between electrodes 1807, however, is transmitted through HOE 1805. Also, light such as ray 1830 is transmitted through the diffractive portion of HOE 1805 if it is either out of the bandwidth of switchable HOE 1805 or incident with an angle that is not sufficiently close to the diffraction angle of switchable HOE 1805 in the region where the ray intersects the HOE. It can be seen that with the use of many electrode plates such as 1807, many different portions of switchable HOE 1805 may be rendered diffractive, partially diffractive, or transparent by applying the appropriate electric field to the relevant portions of switchable HOE 1805. By adjusting the applied electric field, the intensity of the diffracted light may be controlled over a dynamic range. More particularly, when the applied electric field is changed, the diffraction efficiency changes correspondingly. As the field increases, the refractive index modulation is reduced and hence the diffraction efficiency is also reduced with the result that less light is transferred from the zero order direction (i.e., the input beam direction) into the diffracted beam direction. When the electric field is reduced the refractive index modulation increases, resulting in more light being transferred from the zero order direction in the diffracted beam direction. In one embodiment, the HOE is a thin-grating hologram. In another embodiment, switchable HOE 1805 is a Bragg-type or volume hologram with high diffraction efficiency.

One embodiment of this system uses a switchable HOE 1805 composed of photo-polymer/liquid-crystal composite materials onto which holograms characterized by high diffraction efficiency and fast switching rates can be recorded. Switchable HOE 1805 is sandwiched between transparent electrodes, and can be switched from a diffracting state to a passive state by adjusting an electric field applied by the electrodes.

Switchable HOE 1805 may include an exposed PDLC material such as, for example, the material presented in FIG. 1. The PDLC material undergoes phase separation during the exposure process (i.e., during the hologram recording process), creating regions densely populated by liquid crystal droplets, interspersed by regions of clear photopolymer. In the substantially transparent state, an electric field is applied to the exposed PDLC and changes the natural orientation of the liquid crystal droplets therein which, in turn, causes the refractive index modulation of the fringes to reduce and the hologram diffraction efficiency to drop to very low levels, effectively erasing the hologram recorded therein. No electric field is applied in the diffracting state, in which the exposed PDLC material exhibits its very high diffraction efficiency. The exposed PDLC switches between the diffracting state and the substantially transparent state very quickly (e.g., the exposed material can be switched in tens of microseconds, which is very fast when compared with conventional liquid crystal display materials).

Figure 19:
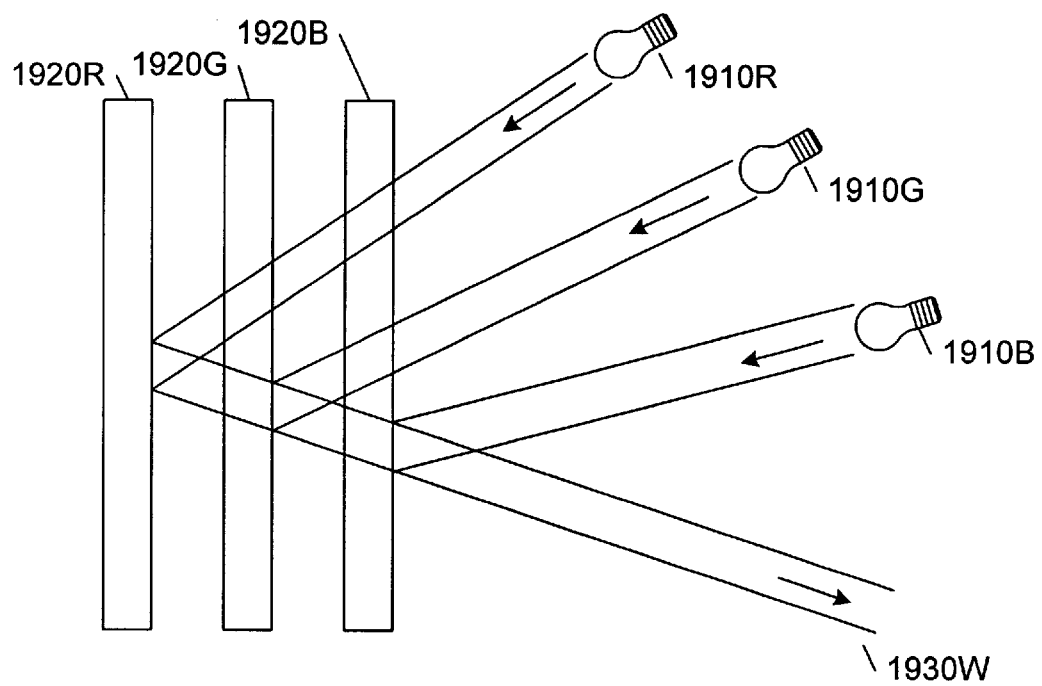
FIG. 19 shows one embodiment of a system using a stack of holographic optical elements to combine light of different colors.

FIGS. 19–20: Combining Optical Sources with Holographic Optical Elements.

FIG. 19 shows one embodiment of a system for combining optical sources of different colors to generate polychromatic light. In this system, three sources of light with different colors, red 1910R, green 1910G, and blue 1910B, are incident upon an HOE stack comprising three HOEs 1920R, 1920G, and 1920B. Each of these HOEs is constructed to diffract light of one color. HOE 1920R diffracts red light, HOE 1920G diffracts green light, and 1920B diffracts blue light. Light from each of the three sources is diffracted by the corresponding one of the three HOEs into a common output direction, and is substantially transmitted through the HOEs that do not have the corresponding color sensitivity. HOEs 1920R, 1920G, and 1920B are aligned so that the light diffracted from each of them is substantially overlapping. This output light travels as a beam of mixed light 1930W. In a preferred embodiment, the relative intensities of the three light sources and the diffraction efficiencies of the three HOEs are matched so that the output light 1930W is a substantially "white" light.

In one embodiment of the system, HOEs 1920R, 1920G, and 1920B are not switchable holograms. These HOEs have fixed diffractive structures with predetermnined diffraction efficiencies and angular sensitivities. In another embodiment, one or more of the three HOEs are switchable HOEs. By controlling an applied electric field across one or more of the switchable HOEs, its diffraction efficiency may be tuned. Having this tunability over the diffraction efficiency of individual color components allows color balancing in the output light 1930W. This tunability may be used to compensate for variations in the brightness of the three light sources, 1910R, 1910G, and 1910B. This controllability may also be used to generate different variations of white light in the output light 1930W. For example, in some applications, a white source with a greater component of red light may be desired. By applying an electric field to HOE 1920R so that its diffraction efficiency is increased, the resulting output light 1930W would be more red, as desired. Alternatively, all three light sources 1910R, 1910G, and 1910B could be run at maximum intensity during normal operation, and the intensities of 1910G and 1910B could be reduced to redden the output tight 1930W.

It is noted simpler systems may involve fewer HOEs. For example, a system for combining two single-color source can be made of a reflection-type HOE placed in front of a mirror. In this system, the HOE is configured and aligned to diffract one of the colors into the output direction. Since the HOEs grating is specific for the first color, the second color of light passes through the HOE without substantial alteration. The second color is reflected from the mirror, back through the HOE, into the output direction.

Figure 20A:
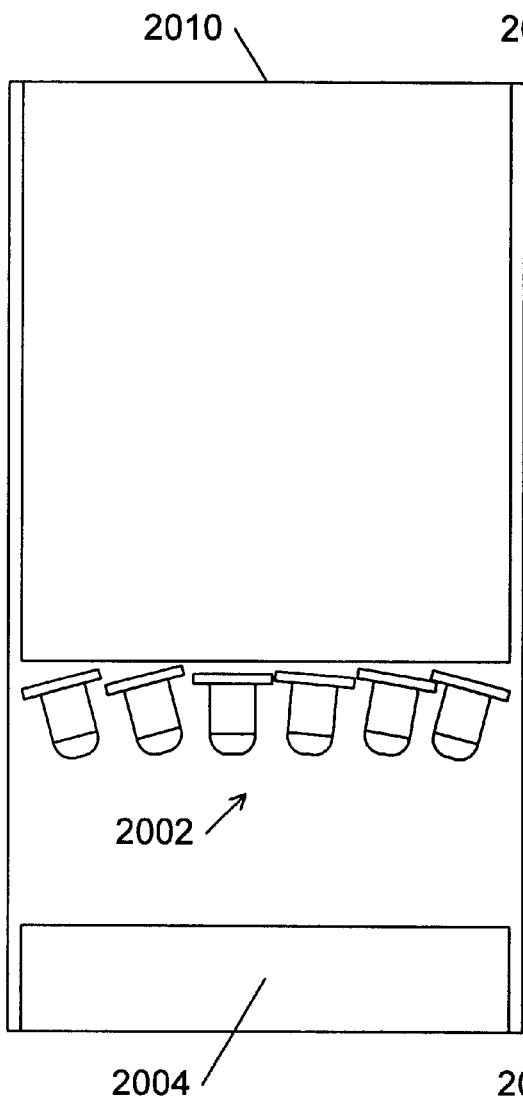
FIG. 20a and FIG. 20b show an alternate embodiment of a system using a stack of holographic optical elements to combine light of different colors.
Figure 20B:
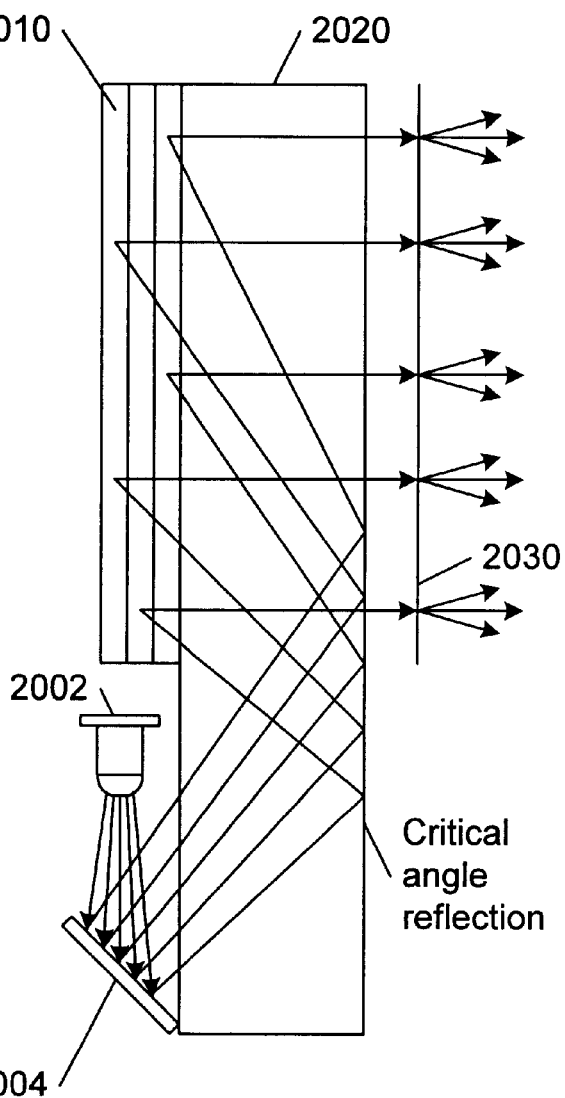

FIG. 20a and FIG. 20b show another embodiment of the holographic illumination system. The system includes a series of LEDs 2002, a mirror 2004, a light guide 2020, a reflective HOE stack 2010 and a diffuser 2030. Mirror 2004 reflects light from the array of LEDs 2002 into light guide 2020. Light guide 2020 is configured to illuminate HOE stack 2010 with the reflected light. The HOEs in HOE stack 2010 collimate the light and direct the light onto diffuser 2030, from where it could, for example, be coupled to the surface of a reflective display by means of a beam splitter. In the example illustrated in FIG. 20a and FIG. 20b, HOE stack 2010 is mounted onto the back of light guide 2020. In this embodiment, light guide 2020 receives three colors of light from LEDs 2002 through a back surface and reflects the light from a front surface onto HOE stack 2010. This reflection may be a total internal reflection or it may be achieved by silvering or partially silvering a portion of the front surface of light guide 2020. In the depicted embodiment, HOE stack 2010 includes three reflection-type HOEs that are each configured to diffract one of the three colors of light. The geometry of the fringes (i.e., refractive index modulation) in each HOE is such that that the diffracted light emerges from each section of the HOEs on substantially parallel paths. The diffracted light is thus effectively collimated. The diffracted light from HOE stack 2010 propagates back through light guide 2020 onto diffuser 2030, which is mounted on or adjacent to the front surface of light guide 2020. In other embodiments, different optical path geometries may be used by designing light guide 2020 accordingly.

LEDs 2002 are preferably bright light sources with high output power concentrated into a narrow bandwidth. HOE stack 2010 is configured to combine different color components of light from the different LEDs into a substantially uniform white light and to provide this white light to diffuser 2030. The individual LEDs are aligned so that their light is incident on HOE stack 2010 at the appropriate angles of incidence.

In other embodiments, LEDs 2002 may be replaced by other illumination sources, such as laser diodes, halogen lamps, incandescent lamps, induction lamps, arc lamps, or others, or combinations thereof. These sources may be monochromatic or broad band. Also, it is noted that HOE stack 2010 may be comprised of transmissive HOE elements instead of reflective HOE elements. One example of an alternative embodiment is shown in FIG. 21.

Figure 21:
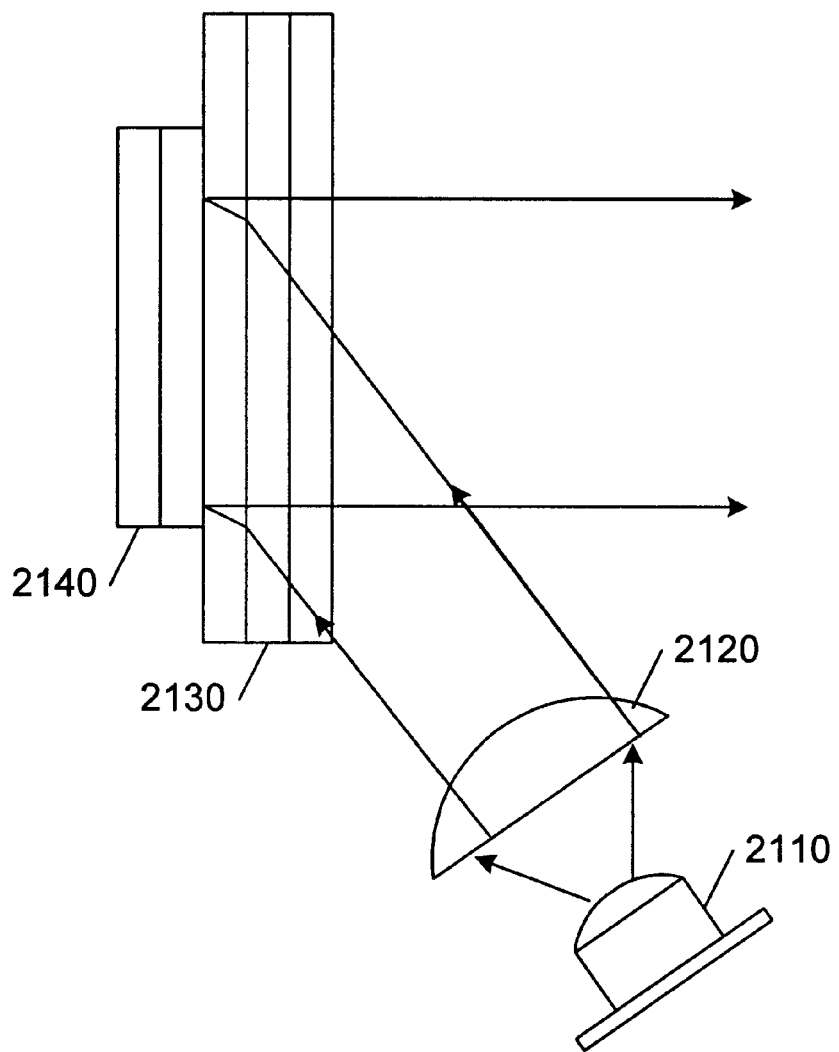
FIG. 21 shows an embodiment of a system using a stack of transmissive holographic optical elements to illuminate an image display.

FIG. 21: Illumination System with Transmissive HOEs.

Another embodiment of an illumination system using holographic optical elements is shown in FIG. 21. The illumination system comprises a light source 2110, a collimating lens 2120, and a transmissive HOE stack 2130 that are used to illuminate a reflective display 2140. Display 2140 is preferably a reflective LCD display with active TFT (thin-film transistor) control elements that maintain the intensity status of the pixels between each refresh of the screen.

In this embodiment, HOE stack 2130 is positioned directly in front of the display. The input light from source 2110 is diffracted by HOE stack 2130 and collimated toward display 2140 at an appropriate incidence angle. After reflection at the display surface, the beam propagates undisturbed through HOE stack 2130, provided that the incidence and reflected angles are separated by an amount greater than the Bragg-diffraction angular bandwidth. It is noted that in this embodiment, HOE stack 2130 may be used to replace a beam splitter.

In this embodiment, light source 2110 is a substantially broad band white-light source, such as an incandescent lamp, an induction lamp, a fluorescent lamp, or an arc lamp, among others. In other embodiments, light source 2110 may be a set of single-color sources with different colors, such as red, green, and blue. These sources may be LEDs, laser diodes, or other monochromatic sources.

Light from source 2110 is collimated by lens 2120 and directed onto HOE stack 2130 at an angle appropriate for diffraction by HOEs in HOE stack 2130. HOE stack 2130 is configured to diffract light from source 2110 onto display 2140. Display 2140 is mounted on the opposite side of HOE stack 2130 from light source 2110. Light diffracted by HOE stack 2130 onto display 2140 is reflected by reflective display 2140 back through HOE stack 2130 with an inscribed image that may be projected for a user by standard projection optics. In one embodiment, HOE stack 2130 comprises nonswitchable HOEs. This system may be used, for example, to illuminate a reflective display mounted in a device with limited space. In other embodiments, HOE stack 2130 comprises switchable HOE elements. As described earlier, by adjusting the electric field applied to each of the HOE elements, the system then provides a means for color balancing the light obtained from light source 2110. In another embodiment, HOE stack 2130 can be used for sequential color switching. In this embodiment, HOE stack 2130 includes red, blue, and green switchable HOEs. Each of these HOEs is activated one at a time in sequence, and display 2140 cycles through blue, green, and red components of an image to be displayed. HOE stack 2130 is switched synchronously with the image on display 2140 at a rate that is fast compared with the integration time of the human eye (less than 100 microseconds). In one embodiment, the system thus uses a single monochromatic display 2140 to provide a color image.

In alternative embodiments, display 2140 may use other forms of reflective LCD display technology, or may be a MEMS device that repositions miniature reflective elements to control the intensity of a pixel. In other embodiments, display 2140 is a transmissive display, and the optical arrangement of the illumination system is configured accordingly.

Figure 22:
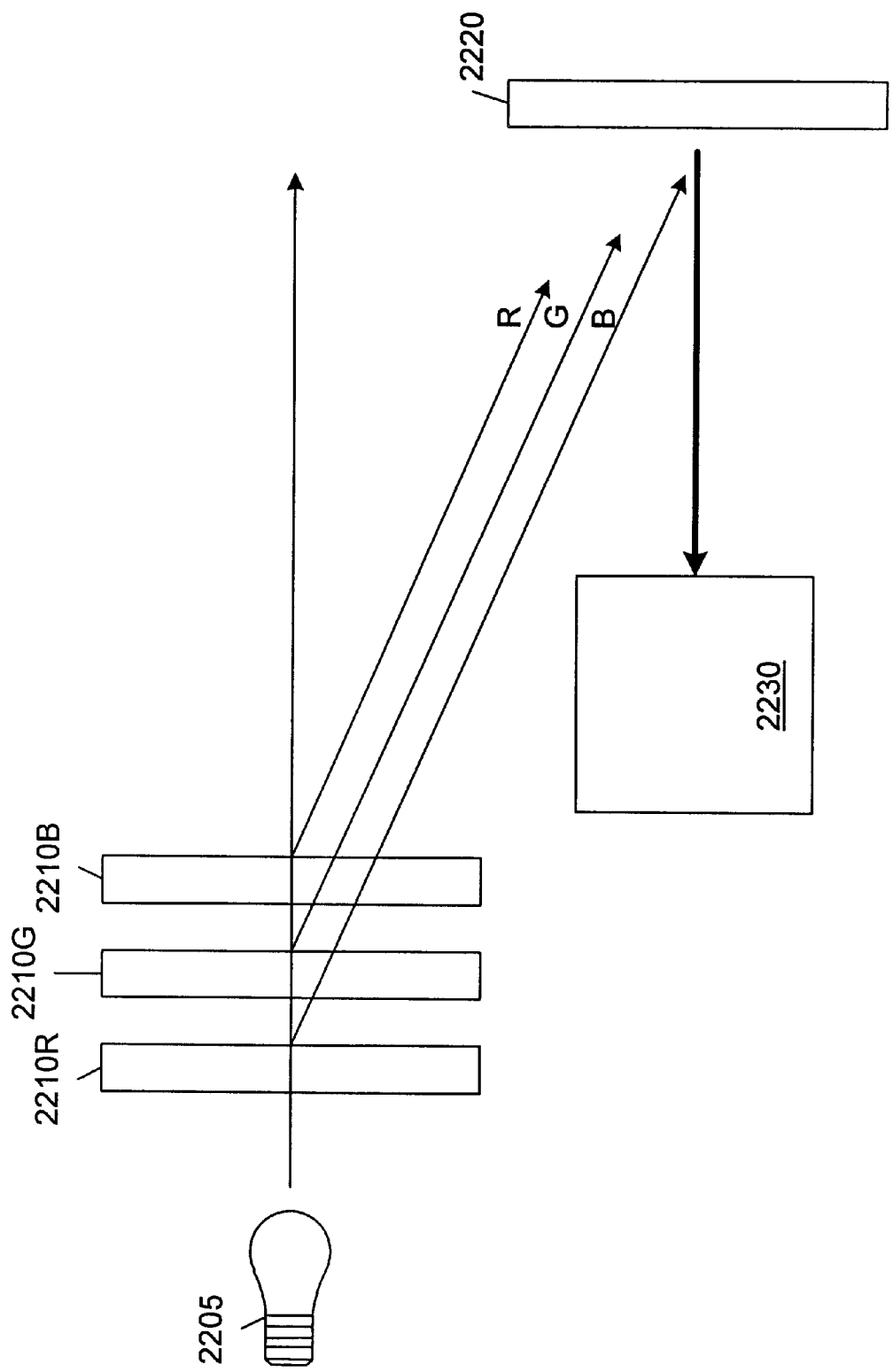
FIG. 22 shows an embodiment of a system in which a stack of transmissive switchable holographic optical elements is used to balance the color intensity in an illumination source for a color-sequenced image display.

FIG. 22: Color Separation and Color Balancing.

FIG. 22 shows a system for separating white light into individual color components. The system comprises three HOE elements 2210R, 2210G, and 2210B capable of diffracting red, green, and blue light, respectively. The HOEs are illuminated with light from a polychromatic or broad band light source 2205. Each of the HOEs diffracts one of the color components from light source 2205 toward a display 2220. Light reflected from 2220 is then coupled into a projection system 2230.

HOE elements 2210R, 2210G, and 2210B are switchable HOEs. They a re turned on one at a time in sequence so that display 2220 is sequentially illuminated by blue, green, and red light. Display unit 2220 is also switched so that it sequentially displays one of the three color components of a desired image. The switching of HOEs 2210, 2210G, and 2210B is synchronous with the switching of display 2220 and is done at a rate faster than an eye-integration time. Thus, the projected image is a composite color image generated b y a single monochromatic display 2220.

It is noted that instead of using HOEs tuned for red, green, and blue light (the nominal color bands of the three types of cones in the human eye), other combinations may be used as appropriate for the application. In general, any set of color components can be used that spans the appropriate color space. One example is the cyan, yellow, and magenta combination used in some printing applications.

The switchable HOEs in the embodiments described above may be Bragg-type elements in order to provide a high diffraction efficiency. However, thin phase switchable HOEs may also be employed, although thin phase HOEs may not provide a high level of diffraction efficiency when compared to Bragg type HOEs. Moreover, it is understood that with appropriate changes in the optical arrangements, reflective-type switchable HOEs may be employed in place of transmissive-type switchable HOEs, and vice-versa. Similarly, reflective-type nonswitchable HOEs may be employed in place of transmissive-type nonswitchable HOEs, and vice-versa.

In the examples illustrated above, some conventional optical elements may be required to correct aberrations introduced by the HOEs and other optical elements. Since these corrective elements do not impact the basic functional description of the systems, they have been omitted for simplicity. It is noted that HOEs may also be used in some embodiments of these systems to correct optical aberrations.

While the present invention has been described with reference to particular embodiments, it will be understood that the embodiments are illustrative and that the invention scope is not limited to these particular embodiments. Variations, modifications, additions, and improvements to the embodiments described are possible. These variations, modifications, additions, and improvements may fall within the scope of the invention as detailed by the following claims.

What is claimed is:

1. A method of combining light from a first illumination source and a second illumination source, the method comprising:

illuminating a switchable holographic optical element (HOE) with light from the first illumination source;

the switchable HOE diffracting light from the first illumination source into an output direction;

transmitting light from the second illumination source through the switchable HOE and onto an optical element;

the optical element deflecting the light transmitted through the switchable HOE from the second illumination source into the output direction.

2. The method of claim 1, wherein the optical element is a second switchable HOE and wherein said deflecting the light comprises diffracting light from the second switchable HOE.

3. The method of claim 1, wherein the switchable HOE operates between an active state and an inactive state, wherein the switchable HOE diffracts light when operating in the active state, wherein the switchable HOE transmits substantially all light without substantial alteration when operating in the inactive state.

4. The method of claim 1, further comprising:

the switchable HOE modifying a spatial profile of the light from the first illumination source.

5. The method of claim 1, wherein the switchable HOE is configured to provide substantially spatially uniform illumination in the output direction.

6. The method of claim 1, wherein at least one of the first and second illumination sources is a narrowband illumination source.

7. The method of claim 1, wherein the first illumination source provides light of a different color than light from the second illumination source.

8. The method of claim 1, wherein at least one of the first and second illumination sources is a laser or a light-emitting diode.

9. The method of claim 1, wherein at least one of the first and second illumination sources is an incandescent bulb or a fluorescent bulb or a halogen lamp or an arc lamp or an induction lamp.

10. The method of claim 1, wherein said deflecting the light comprises deflecting light transmitted through the switchable HOE from the second illumination source so that the deflected light from the second illumination source substantially overlaps with diffracted light from the first illumination source.

11. An illumination system comprising:

a switchable holographic optical element (HOE) configured to diffract light from a first light source into an output direction;

an optical element disposed so that light transmitted from a second light source through said switchable HOE is incident on said optical element, wherein said optical element is configured to deflect switchable HOE-transmitted light from the second light source into the out put direction.

12. The illumination system of claim 11, wherein said optical element is a second switchable HOE configured to diffract switchable HOE-transmitted light from the second light source into the output direction.

13. The illumination system of claim 11, wherein said optical element is a mirror aligned to reflect switchable HOE-transmitted light from the second light source into the output direction.

14. The illumination system of claim 11, wherein said switchable HOE operates between an active state and an inactive state, wherein said switchable HOE diffracts light when operating in the active state, wherein said switchable HOE transmits substantially all light without substantial alteration when operating in the inactive state.

15. The illumination system of claim 11, wherein said switchable HOE is further configured to modify a spatial profile of the light from the first light source.

16. The illumination system of claim 11, wherein said switchable HOE is further configured to provide spatially uniform illumination in the output direction.

17. The illumination system of claim 11, wherein at least one of the first and second light sources is a narrowband light source.

18. The illumination system of claim 11, wherein the first light source provides light of a different color than light from the second light source.

19. The illumination system of claim 11, wherein at least one of the first and second light sources is a laser or a light-emitting diode.

20. The illumination system of claim 11, wherein at least one of the first and second light sources is an incandescent bulb or a fluorescent bulb or a halogen lamp or an arc lamp or an induction lamp.

21. The illumination system of claim 11, wherein said optical element is configured to deflect switchable HOE-transmitted light from the second illumination source to overlap with diffracted light from the first illumination source.

* * * * *